US008213410B2

(12) United States Patent
Benedyk et al.

(10) Patent No.: US 8,213,410 B2
(45) Date of Patent: Jul. 3, 2012

(54) METHODS AND SYSTEMS FOR COMMUNICATING SS7 MESSAGES OVER PACKET-BASED NETWORK USING TRANSPORT ADAPTER LAYER INTERFACE

(75) Inventors: Robby Darren Benedyk, Raleigh, NC (US); David Michael Sprague, Raleigh, NC (US); Dan Alan Brendes, Raleigh, NC (US)

(73) Assignee: Tekelec, Inc., Morrisville, NC (US)

( * ) Notice: Subject to any disclaimer, the term of this patent is extended or adjusted under 35 U.S.C. 154(b) by 875 days.

(21) Appl. No.: 11/184,629

(22) Filed: Jul. 19, 2005

(65) Prior Publication Data

US 2006/0013204 A1    Jan. 19, 2006

Related U.S. Application Data

(60) Division of application No. 09/588,852, filed on Jun. 6, 2000, now Pat. No. 7,002,988, which is a continuation-in-part of application No. 09/443,712, filed on Nov. 19, 1999, now Pat. No. 7,050,456, which is a continuation-in-part of application No. 09/205,809, filed on Dec. 4, 1998, now Pat. No. 6,324,183.

(60) Provisional application No. 60/137,988, filed on Jun. 7, 1999.

(51) Int. Cl.
*H04L 12/66* (2006.01)
(52) U.S. Cl. ......... 370/352; 370/401; 370/389; 370/467
(58) Field of Classification Search .................. 370/352, 370/401, 230; 379/202.01
See application file for complete search history.

(56) References Cited

U.S. PATENT DOCUMENTS

| 4,558,180 A | * | 12/1985 | Scordo ..................... 379/202.01 |
| 4,949,299 A | | 8/1990 | Pickett |
| 5,008,929 A | | 4/1991 | Olsen et al. |
| 5,142,622 A | | 8/1992 | Owens |
| 5,173,897 A | | 12/1992 | Schrodi et al. |
| 5,208,811 A | | 5/1993 | Kashio et al. |
| 5,239,542 A | | 8/1993 | Breidenstein et al. |
| 5,315,641 A | | 5/1994 | Montgomery et al. |
| 5,384,840 A | | 1/1995 | Blatchford et al. |
| 5,420,916 A | | 5/1995 | Sekiguchi |

(Continued)

FOREIGN PATENT DOCUMENTS

CA    2239764    12/1998

(Continued)

OTHER PUBLICATIONS

Official Action of the European Patent Office for Application No. 00 939 602.9-2413 (Dec. 10, 2004).

(Continued)

*Primary Examiner* — Dang Ton
*Assistant Examiner* — Pamit Kaur
(74) *Attorney, Agent, or Firm* — Jenkins, Wilson, Taylor & Hunt, P.A.

(57) ABSTRACT

A transport adapter layer interface (TALI) includes messages, processes, and packet structures for sending and receiving SS7 information over a stream-oriented connection, such as a TCP/IP connection. For example, the TALI interface includes test messages for testing the status of a connection and allow and prohibit messages for enabling and disabling service data communications without invoking a TCP handshaking procedure. The TALI interface also includes SYNC and LENGTH fields for facilitating extraction of individual message packets over a stream-oriented connection.

14 Claims, 13 Drawing Sheets

U.S. PATENT DOCUMENTS

| | | |
|---|---|---|
| 5,430,727 A | 7/1995 | Callon |
| 5,477,531 A | 12/1995 | McKee et al. |
| 5,481,673 A * | 1/1996 | Michelson .................... 709/242 |
| 5,509,010 A | 4/1996 | LaPorta et al. |
| 5,537,461 A * | 7/1996 | Bridges et al. ............. 379/88.17 |
| 5,568,487 A | 10/1996 | Sitbon et al. |
| 5,581,558 A | 12/1996 | Horney, II et al. |
| 5,583,926 A | 12/1996 | Venier et al. |
| 5,583,927 A | 12/1996 | Fly et al. |
| 5,586,177 A | 12/1996 | Farris et al. |
| 5,592,530 A | 1/1997 | Brockman et al. |
| 5,610,910 A | 3/1997 | Focsaneanu et al. |
| 5,612,949 A | 3/1997 | Bennett |
| 5,638,431 A | 6/1997 | Everett et al. |
| 5,640,446 A | 6/1997 | Everett et al. |
| 5,650,998 A | 7/1997 | Angenot et al. |
| 5,651,002 A | 7/1997 | Van Seters et al. |
| 5,657,452 A | 8/1997 | Kralowetz et al. |
| 5,661,790 A | 8/1997 | Hsu |
| 5,664,102 A | 9/1997 | Faynberg |
| 5,675,635 A | 10/1997 | Vos et al. |
| 5,680,437 A | 10/1997 | Segal |
| 5,680,552 A | 10/1997 | Netravali et al. |
| 5,694,463 A | 12/1997 | Christie et al. |
| 5,696,809 A | 12/1997 | Voit |
| 5,701,301 A | 12/1997 | Weisser, Jr. |
| 5,706,286 A | 1/1998 | Reiman et al. |
| 5,712,903 A | 1/1998 | Bartholomew et al. |
| 5,732,213 A | 3/1998 | Gessel et al. |
| 5,740,374 A | 4/1998 | Raffali-Schreinemachers |
| 5,754,752 A | 5/1998 | Sheh et al. |
| 5,761,281 A | 6/1998 | Baum et al. |
| 5,761,290 A | 6/1998 | Farris et al. |
| 5,761,500 A | 6/1998 | Gallant et al. |
| 5,764,750 A | 6/1998 | Chau et al. |
| 5,764,955 A | 6/1998 | Doolan |
| 5,768,361 A | 6/1998 | Cowgill |
| 5,768,525 A | 6/1998 | Kralowetz et al. |
| 5,774,695 A | 6/1998 | Autrey et al. |
| 5,781,534 A | 7/1998 | Perlman et al. |
| 5,787,255 A | 7/1998 | Parlan et al. |
| 5,793,425 A | 8/1998 | Balakrishnan |
| 5,793,771 A | 8/1998 | Darland et al. |
| 5,802,285 A | 9/1998 | Hirviniemi |
| 5,805,587 A | 9/1998 | Norris et al. |
| 5,809,028 A | 9/1998 | Nethercott et al. |
| 5,812,639 A * | 9/1998 | Bartholomew et al. ....... 370/352 |
| 5,812,669 A | 9/1998 | Jenkins et al. |
| 5,812,781 A | 9/1998 | Fahlman et al. |
| 5,815,669 A | 9/1998 | Lee et al. |
| 5,828,844 A | 10/1998 | Civanlar et al. |
| 5,838,782 A | 11/1998 | Lindquist |
| 5,852,660 A | 12/1998 | Lindquist et al. |
| 5,867,495 A | 2/1999 | Elliott et al. |
| 5,870,565 A | 2/1999 | Glitho |
| 5,872,782 A | 2/1999 | Dendi |
| 5,878,129 A | 3/1999 | Figurski et al. |
| 5,889,954 A | 3/1999 | Gessell et al. |
| 5,892,822 A | 4/1999 | Gottlieb et al. |
| 5,898,667 A | 4/1999 | Longfield et al. |
| 5,903,636 A | 5/1999 | Malik |
| 5,905,724 A | 5/1999 | Carson et al. |
| 5,912,887 A | 6/1999 | Sehgal |
| 5,917,900 A | 6/1999 | Allison et al. |
| 5,920,562 A | 7/1999 | Christie et al. |
| 5,923,659 A | 7/1999 | Curry et al. |
| 5,926,482 A | 7/1999 | Christie et al. |
| 5,940,598 A | 8/1999 | Strauss et al. |
| 5,949,865 A | 9/1999 | Fusinato |
| 5,949,871 A | 9/1999 | Kabay et al. |
| 5,958,016 A | 9/1999 | Chang et al. |
| 5,966,431 A | 10/1999 | Reiman et al. |
| 5,971,900 A | 10/1999 | Miller |
| 5,974,052 A | 10/1999 | Johnson et al. |
| 5,991,301 A | 11/1999 | Christie |
| 5,995,608 A | 11/1999 | Detampel, Jr. et al. |
| 6,002,754 A | 12/1999 | Jaiswal et al. |
| 6,006,098 A | 12/1999 | Rathnasabapathy et al. |
| 6,011,780 A | 1/2000 | Vaman et al. |
| 6,011,794 A | 1/2000 | Mordowitz et al. |
| 6,011,803 A | 1/2000 | Bicknell et al. |
| 6,014,379 A | 1/2000 | White et al. |
| 6,018,515 A | 1/2000 | Sorber |
| 6,021,126 A | 2/2000 | White et al. |
| 6,023,502 A | 2/2000 | Bouanaka et al. |
| 6,026,091 A | 2/2000 | Christie et al. |
| 6,028,921 A | 2/2000 | Malik et al. |
| 6,047,005 A | 4/2000 | Sherman |
| 6,055,202 A | 4/2000 | Merritt |
| 6,055,302 A | 4/2000 | Schmersel et al. |
| 6,061,364 A | 5/2000 | Hager et al. |
| 6,064,653 A | 5/2000 | Farris |
| 6,067,546 A | 5/2000 | Lund |
| 6,069,890 A | 5/2000 | White et al. |
| 6,075,783 A | 6/2000 | Voit |
| 6,078,582 A | 6/2000 | Curry et al. |
| 6,079,036 A | 6/2000 | Moharram |
| 6,081,589 A | 6/2000 | Jiang et al. |
| 6,084,892 A | 7/2000 | Benash et al. |
| 6,084,956 A | 7/2000 | Turner et al. |
| 6,094,437 A | 7/2000 | Loehndorf, Jr. et al. |
| 6,097,036 A | 8/2000 | Teshima et al. |
| 6,097,719 A | 8/2000 | Benash et al. |
| 6,097,805 A | 8/2000 | Figurski et al. |
| 6,111,780 A | 8/2000 | Bertin |
| 6,111,870 A | 8/2000 | Kurtz |
| 6,111,893 A | 8/2000 | Volftsun et al. |
| 6,112,090 A | 8/2000 | Valentine |
| 6,115,383 A | 9/2000 | Bell et al. |
| 6,118,779 A | 9/2000 | Madonna |
| 6,118,780 A | 9/2000 | Dunn et al. |
| 6,119,160 A | 9/2000 | Zhang et al. |
| 6,122,255 A | 9/2000 | Bartholomew et al. |
| 6,122,263 A | 9/2000 | Dahlin et al. |
| 6,122,363 A | 9/2000 | Friedlander et al. |
| 6,122,365 A | 9/2000 | Yegoshin |
| 6,125,111 A | 9/2000 | Snow et al. |
| 6,125,177 A | 9/2000 | Whittaker |
| H1880 H | 10/2000 | Vines et al. |
| H1896 H | 10/2000 | Hoffpauir et al. |
| 6,128,379 A | 10/2000 | Smyk |
| 6,134,235 A | 10/2000 | Goldman et al. |
| 6,134,246 A | 10/2000 | Cai et al. |
| 6,137,869 A | 10/2000 | Voit et al. |
| 6,137,874 A | 10/2000 | Brown et al. |
| 6,138,110 A | 10/2000 | Jahn et al. |
| 6,144,667 A | 11/2000 | Doshi et al. |
| 6,144,670 A | 11/2000 | Sponaugle et al. |
| 6,147,999 A | 11/2000 | Honda et al. |
| 6,151,390 A | 11/2000 | Volftsun et al. |
| 6,154,445 A | 11/2000 | Farris et al. |
| 6,154,467 A | 11/2000 | Hager et al. |
| 6,157,710 A | 12/2000 | Figurski et al. |
| 6,167,025 A | 12/2000 | Hsing et al. |
| 6,178,181 B1 | 1/2001 | Glitho |
| 6,189,031 B1 | 2/2001 | Badger et al. |
| 6,192,051 B1 | 2/2001 | Lipman et al. |
| 6,195,425 B1 * | 2/2001 | Farris ........................... 370/401 |
| 6,201,804 B1 | 3/2001 | Kikinis |
| 6,208,642 B1 | 3/2001 | Balachandran et al. |
| 6,215,783 B1 | 4/2001 | Neyman |
| 6,236,722 B1 | 5/2001 | Gilbert et al. |
| 6,240,067 B1 | 5/2001 | Sorber |
| 6,278,697 B1 | 8/2001 | Brody et al. |
| 6,285,754 B1 | 9/2001 | Sun et al. |
| 6,292,479 B1 | 9/2001 | Bartholomew et al. |
| 6,307,926 B1 | 10/2001 | Barton et al. |
| 6,311,186 B1 | 10/2001 | MeLampy et al. |
| 6,314,290 B1 | 11/2001 | Joshi et al. |
| 6,324,173 B1 | 11/2001 | Deschaine et al. |
| 6,324,183 B1 | 11/2001 | Miller et al. |
| 6,327,258 B1 | 12/2001 | Deschaine et al. |
| 6,327,267 B1 | 12/2001 | Valentine et al. |
| 6,327,350 B1 | 12/2001 | Spangler et al. |
| 6,328,267 B1 | 12/2001 | Mori |
| 6,330,250 B1 | 12/2001 | Curry et al. |
| 6,330,614 B1 | 12/2001 | Aggarwal et al. |

| | | |
|---|---|---|
| 6,333,931 B1 | 12/2001 | LaPier et al. |
| 6,335,937 B1 | 1/2002 | Chao et al. |
| 6,349,099 B1 | 2/2002 | Larikka et al. |
| 6,366,655 B1 | 4/2002 | Book et al. |
| 6,377,799 B1 | 4/2002 | Hameleers et al. |
| 6,385,301 B1 | 5/2002 | Nolting et al. |
| 6,393,022 B1 | 5/2002 | Hewett et al. |
| 6,393,581 B1 | 5/2002 | Friedman et al. |
| 6,411,604 B1 | 6/2002 | Brockman et al. |
| 6,411,632 B2 * | 6/2002 | Lindgren et al. ............ 370/466 |
| 6,415,027 B1 | 7/2002 | Malik |
| 6,425,009 B1 | 7/2002 | Parrish et al. |
| 6,430,189 B1 | 8/2002 | Juntumaa et al. |
| 6,442,169 B1 | 8/2002 | Lewis |
| 6,459,697 B1 | 10/2002 | Neyman |
| 6,459,783 B1 | 10/2002 | March et al. |
| 6,483,837 B1 | 11/2002 | Howell et al. |
| 6,483,842 B1 | 11/2002 | Mauger |
| 6,487,286 B1 | 11/2002 | Reaves et al. |
| 6,496,512 B1 | 12/2002 | Medhat |
| 6,501,764 B1 | 12/2002 | Fudatate et al. |
| 6,504,923 B1 | 1/2003 | Swale |
| 6,507,649 B1 | 1/2003 | Tovander |
| 6,515,985 B2 | 2/2003 | Shmulevich et al. |
| 6,515,997 B1 | 2/2003 | Feltner et al. |
| 6,522,667 B1 | 2/2003 | Oda et al. |
| 6,529,524 B1 | 3/2003 | Liao et al. |
| 6,535,599 B1 | 3/2003 | Torrey et al. |
| 6,542,497 B1 | 4/2003 | Curry et al. |
| 6,546,003 B1 | 4/2003 | Farris |
| 6,553,427 B1 | 4/2003 | Chang et al. |
| 6,563,835 B1 | 5/2003 | Chen |
| 6,574,216 B1 * | 6/2003 | Farris et al. ................. 370/352 |
| 6,577,626 B2 | 6/2003 | Christie et al. |
| 6,584,190 B1 | 6/2003 | Bressler |
| 6,594,246 B1 | 7/2003 | Jorgensen |
| 6,594,258 B1 | 7/2003 | Larson et al. |
| 6,611,532 B1 | 8/2003 | Madour et al. |
| 6,611,533 B1 | 8/2003 | Liao et al. |
| 6,625,170 B1 | 9/2003 | Curry et al. |
| 6,631,133 B1 | 10/2003 | Christi et al. |
| 6,636,504 B1 | 10/2003 | Albers et al. |
| 6,668,051 B1 | 12/2003 | Ashdown et al. |
| 6,674,748 B1 | 1/2004 | Dykhuizen et al. |
| 6,678,242 B1 | 1/2004 | Simon |
| 6,680,953 B1 | 1/2004 | Kim |
| 6,681,009 B1 | 1/2004 | Graf et al. |
| 6,683,881 B1 | 1/2004 | Mijares et al. |
| 6,700,972 B1 | 3/2004 | McHugh et al. |
| 6,714,639 B1 | 3/2004 | Bedingfield et al. |
| 6,724,752 B1 | 4/2004 | Turtiainen et al. |
| 6,731,741 B1 | 5/2004 | Fourcand et al. |
| 6,748,069 B1 | 6/2004 | Nimmagadda et al. |
| 6,760,343 B1 | 7/2004 | Krishnamurthy et al. |
| 6,782,004 B1 | 8/2004 | Brusilovsky et al. |
| 6,912,590 B1 | 6/2005 | Lundbäck et al. |
| 6,940,866 B1 | 9/2005 | Miller et al. |
| 6,944,184 B1 | 9/2005 | Miller et al. |
| 6,954,526 B1 | 10/2005 | Glenn et al. |
| 6,965,592 B2 | 11/2005 | Tinsley et al. |
| 6,967,956 B1 | 11/2005 | Tinsley et al. |
| 6,987,781 B1 | 1/2006 | Miller et al. |
| 6,990,089 B2 | 1/2006 | Benedyk et al. |
| 6,996,225 B1 | 2/2006 | Bordonaro et al. |
| 7,002,988 B1 | 2/2006 | Benedyk et al. |
| 7,031,340 B2 | 4/2006 | Sprague et al. |
| 7,046,667 B2 | 5/2006 | Sprague et al. |
| 7,050,456 B1 | 5/2006 | Sprague et al. |
| 7,088,728 B2 | 8/2006 | Delaney et al. |
| 7,113,581 B2 | 9/2006 | Benedyk et al. |
| 7,120,139 B1 | 10/2006 | Kung et al. |
| 7,190,702 B2 | 3/2007 | Sprague et al. |
| 7,242,695 B2 | 7/2007 | Sprague et al. |
| 7,274,662 B1 * | 9/2007 | Kalmanek et al. ............ 370/230 |
| 7,318,091 B2 | 1/2008 | Brendes et al. |
| 7,327,670 B2 | 2/2008 | Sprague et al. |
| 7,522,580 B2 | 4/2009 | Miller et al. |
| 7,525,997 B2 | 4/2009 | Benedyk et al. |
| 7,532,647 B2 | 5/2009 | Eichler et al. |
| 7,564,870 B2 | 7/2009 | Miller et al. |
| 7,573,905 B2 | 8/2009 | Benedyk et al. |
| 7,616,659 B2 | 11/2009 | Benedyk et al. |
| 7,743,131 B2 | 6/2010 | Brendes et al. |
| 7,839,889 B2 | 11/2010 | Sprague et al. |
| 2001/0029182 A1 | 10/2001 | McCann et al. |
| 2001/0046227 A1 | 11/2001 | Matsuhira et al. |
| 2001/0046234 A1 | 11/2001 | Agrawal et al. |
| 2001/0049730 A1 | 12/2001 | Brendes et al. |
| 2001/0055380 A1 | 12/2001 | Benedyk et al. |
| 2002/0048360 A1 | 4/2002 | Zambre et al. |
| 2002/0105969 A1 | 8/2002 | Benedyk et al. |
| 2002/0131400 A1 | 9/2002 | Tinsley et al. |
| 2002/0150221 A1 | 10/2002 | Carson et al. |
| 2003/0156578 A1 | 8/2003 | Bergenlid et al. |
| 2004/0114611 A1 | 6/2004 | O'Connell et al. |
| 2005/0238036 A1 | 10/2005 | Miller et al. |
| 2005/0265341 A1 | 12/2005 | Benedyk et al. |
| 2005/0286502 A1 | 12/2005 | Benedyk et al. |
| 2006/0013203 A1 | 1/2006 | Benedyk et al. |
| 2006/0013264 A1 | 1/2006 | Eichler et al. |
| 2006/034329 A1 | 2/2006 | Miller et al. |
| 2006/0077978 A1 | 4/2006 | Sprague et al. |
| 2008/0075068 A1 | 3/2008 | Brendes et al. |
| 2008/0075115 A1 | 3/2008 | Brendes et al. |
| 2011/0064075 A1 | 3/2011 | Sprague et al. |

FOREIGN PATENT DOCUMENTS

| | | |
|---|---|---|
| EP | 0 853 411 | 7/1998 |
| EP | 1 014 735 | 12/1999 |
| EP | 1 054 568 | 5/2000 |
| EP | 1 026 861 A2 | 8/2000 |
| EP | 1 089 575 | 9/2000 |
| EP | 1 206 079 A2 | 5/2002 |
| EP | 1 679 848 A1 | 7/2006 |
| EP | 1 161 819 B1 | 8/2006 |
| EP | 1 177 660 B1 | 8/2006 |
| EP | 1 135 905 B1 | 10/2006 |
| EP | 1 169 829 B1 | 10/2006 |
| EP | 1 169 816 B1 | 11/2006 |
| EP | 1 192 758 B1 | 2/2007 |
| EP | 1 755 295 A1 | 2/2007 |
| EP | 1 715 658 B1 | 10/2007 |
| EP | 1 371 246 B1 | 7/2008 |
| EP | 1 314 324 B1 | 8/2008 |
| EP | 1 755 295 B1 | 7/2009 |
| EP | 1 679 848 B1 | 3/2010 |
| EP | 1 290 854 B1 | 7/2010 |
| EP | 1 356 686 B1 | 7/2010 |
| EP | 1 169 817 B1 | 6/2011 |
| WO | WO 97/11563 | 3/1997 |
| WO | WO 97/33441 | 9/1997 |
| WO | WO 97/42774 | 11/1997 |
| WO | WO 97/42776 | 11/1997 |
| WO | WO 97/46045 | 12/1997 |
| WO | WO 98/28879 | 7/1998 |
| WO | WO 98/28885 | 7/1998 |
| WO | WO 98/28897 | 7/1998 |
| WO | WO 99/09759 | 2/1999 |
| WO | WO 99/16256 | 4/1999 |
| WO | WO 00/56032 | 1/2000 |
| WO | WO 00/19758 | 4/2000 |
| WO | WO 00/22840 | 5/2000 |
| WO | WO 00/30369 | 5/2000 |
| WO | WO 00/31933 | 6/2000 |
| WO | WO 00/33519 | 6/2000 |
| WO | WO 00/35155 | 6/2000 |
| WO | WO 00/35156 | 6/2000 |
| WO | WO 00/54476 | 9/2000 |
| WO | WO 00/60812 | 10/2000 |
| WO | WO 00/60814 | 10/2000 |
| WO | WO 00/60821 | 10/2000 |
| WO | WO 00/65785 | 11/2000 |
| WO | WO 00/76134 A1 | 12/2000 |
| WO | WO 01/11825 | 2/2001 |
| WO | WO 01/24499 | 4/2001 |
| WO | WO 01/37532 | 5/2001 |
| WO | WO 01/82635 A1 | 11/2001 |
| WO | WO 01/93526 A2 | 12/2001 |

| | | |
|---|---|---|
| WO | WO 02/07455 A1 | 1/2002 |
| WO | WO 02/056618 A2 | 7/2002 |
| WO | WO 02/060192 A2 | 8/2002 |

OTHER PUBLICATIONS

Official Action from the European Patent Office (Sep. 21, 2004).
Pai, "In-Building Wireless: The Next Generation," TelephonyOnline. com, pp. 1-4 (Jun. 30, 2004).
Official Action in U.S. Appl. No. 10/403,457 (May 6, 2004).
Handa, "In Building Wireless: The Next Generation," TMCnet.com, pp. 1-7 (Feb. 12, 2004).
Fitchard, "A New Voice in the Boardroom," Wireless Review, pp. 1-3 (Sep. 1, 2003).
"Fixed Wireless Technology," ISP Planet, pp. 1-4 (May 14, 2002).
Martinek, "Office on the Fly," Wireless Review, pp. 1-4 (Jul. 15, 2001).
"March Networks 3300 Integrated Communications Platform," Mitel Networks Corporation, pp. 1-34 (Jul. 2001).
Commonly-assigned, co-pending U.S. Appl. No. 09/618,807 for "Methods and Systems for Providing Dynamic Routing Key Registration," (Unpublished, filed Jul. 28, 2000).
Commonly-assigned, co-pending U.S. Appl. No. 09/588,852 for "Methods and Systems for Communicating SS7 Messages Over Packet-Based Network Using Transport Adapter Layer Interface," (Unpublished, filed Jun. 6, 2000).
Swartz, "Ready, Set, Wireless Office!," Wireless Review, pp. 1-4 (Jun. 1, 2000).
"Telstra and Ericsson Trial Next Generation Wireless Office Solution," Ericsson, pp. 1-2 (Apr. 28, 2000).
Commonly-assigned, co-pending U.S. Appl. No. 09/559,767 for "Methods and Systems for Routing Signaling Messages in a Communications Network Using Circuit Identification Code (CIC) Information," (Unpublished, filed Apr. 27, 2000).
"Mitel and Ericsson Join Forces to Deliver an Integrated Digital Wireless Office Solution with PBX Functionality—Company Business and Marketing," Cambridge Telcom Report, pp. 1-4 (Apr. 24, 2000).
Commonly-assigned, co-pending U.S. Appl. No. 09/543,135 for "System and Method for Routing Calls from a Voice Network to a Data Communications Network," (Unpublished, filed Apr. 5, 2000).
"Market and Development Agreement Targets Customers Looking for Ways to Become More Productive Through Convenient and Cost-Effective Communication," Ericsson Press Release, pp. 1-2 (Apr. 4, 2000).
Commonly-assigned, co-pending U.S. Appl. No. 09/541,853 for "Edge Device and Method for Interconnecting SS7 Signaling Points (SPs) Using Edge Device," (Unpublished, filed Apr. 3, 2000).
Commonly-assigned, co-pending U.S. Appl. No. 09/537,835 for "Methods and Systems for Providing Database Node Access Control Functionality in a Communications Network Routing Node," (Unpublished, filed Mar. 29, 2000).
Sulkin, "Emerging Options for Wireless PBXs," Voice2000, pp. 1-8 (Feb. 2000).
Drzewianowksi, "WLANs—For the Picking," Communications Solutions™ Next-Gen Networks, pp. 1-9 (Jan. 2000).
"The Wireless Business Connection," Second Quarter 2000 Report, The Phillips Group—Infotech, pp. 1-9 (2000).
Commonly-assigned, co-pending U.S. Appl. No. 09/443,712 for "Methods and Systems for Communicating Signaling System 7 (SS7) User Part Messages Among SS7 Signaling Points (SPS) and Internet Protocol (IP) Nodes Using Signal Transfer Points (STPS)," (Unpublished, filed Nov. 19, 1999).
O'Shea, "Mating Season," Telephony, p. 10-11, (Sep. 20, 1999).
"Ericsson Announces General Availability of Its Mobile Advantage Wireless Office System," Ericsson Press Release, pp. 1-2 (Nov. 4, 1999).
"Corporate Offices to Go Wireless First Australian GSM on the Net Trial," Ericsson Press Release, pp. 1-3 (Aug. 11, 1999).
"Ericsson Solution Chosen for World's First Combined DECT/GSM Communications Service," Ericsson, pp. 1-9 (Jun. 21, 1999).

Hamdi et al., "Voice Service Interworking for PSTN and IP Networks," IEEE Communications Magazine, p. 104-111, ( Jun. 5, 1999).
Sprague et al., "Transport Adapter Layer Interface," Tekelec, p. 1-30, (May 28, 1999).
Lakshmi-Ratan, "The Lucent Technologies Softswitch—Realizing the Promise of Convergence," Bell Labs Technical Journal, p. 174-195, (Apr. 5, 1999).
Bressler, "SS7 Level Two Over IP," *Nortel Networks*, pp. 1-6 (Jan. 1999).
Johanson et al., "Mobile Advantage Wireless Office—A Digital Wireless Office System for TDMA/136 Networks," Ericsson Review No. 1, pp. 20-27 (1999).
"Enterprise IP Gateway," Ericsson, pp. 1-6 (1999).
"The Ericsson IPT System," Ericsson, pp. 1-8 (1999).
"Wireless: Top Ericsson Executives Lay Out Corporate Vision, Unveil Strategy for the Enterprise Customer—Company Business and Marketing," EDGE, On & About AT&T, pp. 1-5 (Nov. 30, 1998).
Michael McGrew, "Transport SS7 Signaling Over IP," Lucent Technologies Inc., p. 1-8, (Nov. 1998).
Tekelec, "Eagle® Feature Guide," PN/9110-1225-01, (Jan. 1998).
"Ericsson Wireless Office Services to Provide Digital System Through AT&T Wireless Services," Ericsson Press Release, pp. 1-2 (Apr. 17, 1998).
Tekelec, "Eagle® STP Platform," 908-0134-01, (1997).
Tekelec, "STP Lan Interface Feature," 908-0134-01, (1997).
Tekelec, "STP Database Transport Access Feature," 908-0136-01, (1997).
Tekelec, "STP X.25 to SS7-IS.41 Protocol Conversion Feature," 908-0135-01, (1997).
Tekelec, "STP ANSI-ITU Gateway Feature," 908-0133-01, (1997).
Tekelec, "SS7-Frame Relay Access Device SS7 Protocol Information Translator," 908-0167-01, (1997).
O'Shea, "The Network That's Never Done," Telephony, p. 38-43, (Sep. 15, 1997).
Snyder, "Rerouting Internet Traffic Jams," Telephony, p. 12, (Nov. 11, 1996).
Snyder, "Branded With Optics," Telephony, p. 49-50, (Jul. 22, 1996).
Anonymous, "Around the Loop," Telephony, p. 26, (Jul. 22, 1996).
Douglas E. Comer, "Internetworking with TCP/IP," Principles, Protocols, and Architecture, 3rd ed., Prentice Hall (New Jersey), p. 6-8, (1995).
Woods, "Fresno Bee Still Buzzing About Wireless," TechNews, pp. 1-2 (1995).
Bellcore, "Signaling Transfer Point (STP) Generic Requirements," Technical Advisory, No. 5, p. 3.1-3.3, 4.1, and 4.43-4.46, (May 1992).
Zaharychuk et al., "Gateway Signal Transfer Points: Design, Services and Benefits," IEEE, p. 223.2.1-223.2.8, (1990).
Bootman et al., "Generic Building Blocks for the Telecommunications Management Network," IEEE, p. 6.1.1-6.1.5, (1988).
Bootman, "Intelligent Network Services Using a Service Switching Node," IEEE, p. 40.7.1-40.2.4, (1988).
Buckles, "Very High Capacity Signaling Transfer Point for Intelligent Network Services," IEEE, p. 40.2.1-40.2.4, (1988).
"teleSys Announces the Compatibility of Ericsson's Mobile Advantage Wireless Office and teleSys' MACH-IP Gateway," teleSys Software—Press Release, pp. 1-2 (Publication Date Unknown).
Weekly Status Report for week of Jun. 15-Jun. 18, 1998 (Unpublished).
Weekly Status Report for the weeks of Jul. 6-Jul. 10, 1998 (Unpublished).
Weekly Status Report for week of Jul. 13-Jul. 17, 1998 (Unpublished).
Affidavit of David M. Sprague filed in commonly-assigned, co-pending U.S. Appl. No. 09/443,712 (Unpublished).
PCS Access Network Requirements: Interface Specification, Interface: Service Access Socket System Interface (SASSI), Version 01.01, Dec. 3, 1998 (Unpublished).
PCS Access Network Requirements: Product Specification, Network Element: Gateway Signal Transfer Point between CCS/SS7 and TCP-IP Networks (GW-STP-IP), Dec. 3, 1998 (Unpublished).

Notice of Allowance and Fee(s) Due for U.S. Appl. No. 11/130,422 (Feb. 9, 2009).
Official Action for U.S. Appl. No. 11/282,966 (Mar. 11, 2009).
Interview Summary for U.S. Appl. No. 11/184,632 (Feb. 25, 2009).
Notice of Allowance and Fee(s) Due for U.S. Appl. No. 11/224,705 (Feb. 24, 2009).
Communication pursuant to Article 94(3) EPC for European Patent Application No. 00 920 080.9 (Feb. 16, 2009).
Notice of Allowance and Fee(s) Due for U.S. Appl. No. 09/618,807 (Jul. 27, 2004).
Official Action for U.S. Appl. No. 09/541,853 (Jul. 15, 2004).
Restriction and/or Election Requirement for U.S. Appl. No. 09/770,316 (Jun. 14, 2004).
Official Action for U.S. Appl. No. 09/537,835 (Jun. 4, 2004).
Official Action for U.S. Appl. No. 09/735,142 (May 27, 2004).
Official Action for U.S. Appl. No. 09/543,135 (May 13, 2004).
Communication pursuant to Article 96(2) EPC for European Application No. 00928464.7 (Apr. 16, 2004).
Official Action in U.S. Appl. No. 09/588,852 (Apr. 13, 2004).
Official Action for U.S. Appl. No. 09/559,767 (Feb. 26, 2004).
Official Action for U.S. Appl. No. 09/443,712 (Feb. 17, 2004).
Official Action for U.S. Appl. No. 09/768,881 (Jan. 9, 2004).
Restriction Requirement in U.S. Appl. No. 09/588,852 (Dec. 30, 2003).
Official Action for U.S. Appl. No. 09/839,394 (Dec. 1, 2003).
Communication pursuant to Article 96(2) EPC for European Application No. 00919979.5 (Nov. 18, 2003).
Communication pursuant to Article 96(2) EPC for European Application No. 00919614.8 (Nov. 17, 2003).
Notification of Transmittal of International Preliminary Examination Report for International Application No. PCT/US02/01977 (Nov. 10, 2003).
Official Action for U.S. Appl. No. 09/541,853 (Oct. 31, 2003).
Official Action for U.S. Appl. No. 09/618,807 (Oct. 22, 2003).
Notification of Transmittal of International Preliminary Examination Report for International Application No. PCT/US02/01977 (Sep. 23, 2003).
Official Action for U.S. Appl. No. 09/537,835 (Sep. 16, 2003).
Official Action for U.S. Appl. No. 09/443,712 (Aug. 18, 2003).
Official Action for U.S. Appl. No. 10/403,457 (Aug. 13, 2003).
Official Action for U.S. Appl. No. 09/543,135 (Jul. 25, 2003).
Restriction and/or Election Requirement for U.S. Appl. No. 09/541,853 (Jul. 16, 2003).
Notification of Transmittal of the International Search Report or the Declaration in International Application No. PCT/US01/48269 (May 22, 2003).
Written Opinion for International Application No. PCT/US02/01977 (May 21, 2003).
Official Action for U.S. Appl. No. 09/768,881 (May 9, 2003).
Official Action for U.S. Appl. No. 09/618,807 (Apr. 15, 2003).
Official Action for U.S. Appl. No. 09/443,712 (Mar. 14, 2003).
Invitation to Pay Additional Fees for International Application No. PCT/US01/48269 (Feb. 26, 2003).
Restriction and/or Election Requirement for U.S. Appl. No. 09/443,712 (Jan. 29, 2003).
Notification of Transmittal of International Preliminary Examination Report for International Application No. PCT/US01/12922 (Apr. 3, 2002).
International Search Report for International Application No. PCT/US01/17483 (Mar. 25, 2002).
Written Opinion for International Application No. PCT/US01/12922 (Feb. 13, 2002).
Notice of Allowance and Issue Fee Due for U.S. Appl. No. 09/205,809 (Sep. 25, 2001).
Notification of Transmittal of International Preliminary Examination Report for International Application No. PCT/US00/11322 (Aug. 2, 2001).
Notification of Transmittal of International Preliminary Examination Report for International Application No. PCT/US00/08614 (Jul. 30, 2001).
Supplemental Notice of Allowability for U.S. Appl. No. 09/205,809 (May 23, 2001).
Notification of Transmittal of International Preliminary Examination Report for International Application No. PCT/US00/07876 (Mar. 27, 2001).
Notice of Allowance and Fees Due for U.S. Appl. No. 09/205,809 (Feb. 27, 2001).
Official Action for U.S. Appl. No. 09/205,809 (Jan. 3, 2001).
Sidebottom et al., "SS7 MTP3-User Adaptation Layer (M3UA)," Internet Draft, Network Working Group, pp. 1-79 (Nov. 2000).
Affidavit of Dr. Harry G. Perros (Oct. 11, 2000).
Notification of Transmittal of International Preliminary Examination Report for International Application No. PCT/US99/27572 (Oct. 6, 2000).
Notification of Transmittal of International Preliminary Examination Report for International Application No. PCT/US99/27397 (Oct. 5, 2000).
Decision to grant a European patent pursuant to Article 97(1) EPC corresponding to European Patent No. 1314324 (Jul. 31, 2008).
Extended European Search Report for European Patent Application No. 06122282.4 (Jan. 19, 2007).
Notice of Allowance and Fee(s) Due for U.S. Appl. No. 10/403,459 (Dec. 21, 2006).
Advisory Action for U.S. Appl. No. 09/543,135 (Dec. 13, 2006).
Official Action for U.S. Appl. No. 09/770,316 (Dec. 5, 2006).
Communication pursuant to Article 96(2) EPC in European Application No. 01928718.4 (Nov. 20, 2006).
Communication pursuant to Article 96(2) EPC in European Application No. 06005210.7 (Aug. 30, 2006).
Supplemental Notice of Allowability for U.S. Appl. No. 09/839,394 (Aug. 17, 2006).
Official Action for U.S. Appl. No. 09/543,135 (Aug. 16, 2006).
Official Action for U.S. Appl. No. 10/403,460 (Aug. 9, 2006).
Official Action for U.S. Appl. No. 10/403,459 (Aug. 9, 2006).
Official Action for U.S. Appl. No. 10/403,455 (Aug. 9, 2006).
Communication pursuant to Article 96(2) EPC for European Application No. 00950411.9 (Jun. 23, 2006).
Official Action for U.S. Appl. No. 09/543,135 (Jun. 19, 2006).
Extended European Search Report for European Application No. 06005210.7 (Jun. 6, 2006).
Advisory Action for U.S. Appl. No. 09/770,316 (Mar. 21, 2006).
Notice of Panel Decision from Pre-Appeal Brief Review for U.S. Appl. No. 09/770,316 (Feb. 14, 2006).
Notice of Allowance and Fee(s) Due for U.S. Appl. No. 10/403,461 (Feb. 13, 2006).
Communication pursuant to Article 96(2) EPC in European Application No. 01939711.6 (Feb. 6, 2006).
Supplemental Notice of Allowability for U.S. Appl. No. 09/443,712 (Jan. 31, 2006).
Supplemental Notice of Allowability in U.S. Appl. No. 09/588,852 (Dec. 22, 2005).
Notice of Allowance and Fee(s) Due for U.S. Appl. No. 10/403,457 (Dec. 6, 2005).
Supplemental Notice of Allowability for U.S. Appl. No. 09/735,142 (Dec. 5, 2005).
Communication pursuant to Article 96(2) EPC in EP Patent Application No. 01989213.2 (Nov. 7, 2005).
Advisory Action for U.S. Appl. No. 09/543,135 (Sep. 21, 2005).
Official Action for U.S. Appl. No. 09/443,712 (Sep. 21, 2005).
Supplemental Notice of Allowability for U.S. Appl. No. 09/559,767 (Sep. 2, 2005).
Supplemental Notice of Allowability for U.S. Appl. No. 09/534,281 (Aug. 25, 2005).
Official Action for U.S. Appl. No. 09/770,316 (Jul. 27, 2005).
Notice of Allowance and Fee(s) Due for U.S. Appl. No. 09/768,881 (Jun. 2, 2005).
Official Action for U.S. Appl. No. 10/403,457 (May 19, 2005).
Official Action for U.S. Appl. No. 10/403,461 (May 17, 2005).
Notice of Allowance and Fee(s) Due for U.S. Appl. No. 09/537,835 (Apr. 19, 2005).
Official Action for U.S. Appl. No. 09/543,135 (Mar. 30, 2005).
Communication pursuant to Article 96(2) EPC for European Application No. 01989213.2 (Mar. 7, 2005).
Supplemental Notice of Allowability for U.S. Appl. No. 09/541,853 (Mar. 7, 2005).

Notice of Allowance in U.S. Appl. No. 09/588,852 (Mar. 2, 2005).
Notice of Allowance and Fee(s) Due for U.S. Appl. No. 09/618,807 (Feb. 25, 2005).
Notice of Allowance and Fee(s) Due for U.S. Appl. No. 09/735,142 (Feb. 14, 2005).
Notification of Transmittal of International Preliminary Examination Report for International Application No. PCT/US00/08837 (Feb. 7, 2005).
Notification of Transmittal of International Preliminary Report on Patentability for International Application No. PCT/US01/48269 (Jan. 11, 2005).
Official Action for U.S. Appl. No. 09/443,712 (Dec. 29, 2004).
Invitation pursuant to Article 96(2) and Rule 51(2) EPC for EP Application No. 00919979.5 (Dec. 16, 2004).
Official Action for U.S. Appl. No. 09/768,881 (Dec. 14, 2004).
Notice of Allowance and Fee(s) Due for U.S. Appl. No. 09/534,281 (Nov. 29, 2004).
Notice of Allowance and Fee(s) Due for U.S. Appl. No. 09/559,767 (Nov. 17, 2004).
Notice of Allowance and Fee(s) Due for U.S. Appl. No. 09/541,853 (Nov. 17, 2004).
Communication under Rule 112 EPC in European Application No. 01989213.2 (Nov. 17, 2004).
Communication pursuant to Article 96(2) EPC for European Application No. 00919614.8 (Nov. 10, 2004).
Official Action for U.S. Appl. No. 09/770,316 (Nov. 3, 2004).
Notice of Allowance and Fee(s) Due for U.S. Appl. No. 09/839,394 (Aug. 24, 2004).
Notice of Allowance and Fee(s) Due for U.S. Appl. No. 11/180,028 (Apr. 10, 2009).
Notification of Transmittal of International Preliminary Report on Patentability for International Application No. PCT/US00/19515 (Mar. 30, 2009).
Written Opinion for International Application No. PCT/US00/19515 (Jun. 20, 2008).
Notification of Transmittal of the International Search Report or the Declaration for International Application No. PCT/US00/19515 (Mar. 26, 2001).
Stewart et al., "Stream Control Transmission Protocol," Request for Comments: 2960, Network Working Group, pp. 1-118, (Oct. 2000).
"Digital Cellular Telecommunications System (Phase 2+) (GSM); Universal Mobile Telecommunications System (UMTS); Telecommunication Management Charging and Billing; 3G Call and Event Data for the Packet Switched (PS) Domain (3GPP TS 32.015 Version 3.3.0 Release 1999)," Global System for Mobile Communications, pp. 1-65 (Sep. 2000).
Sidebottom et al., "SS7 MTP3-User Adaptation Layer (M3UA)," Internet draft, IETF Network Working Group, p. 1-75, (Sep. 2000).
Subbiah et al., "Transport Architecture Evolution in UMTS/IMT-2000 Cellular Networks," International Journal of Communication Systems, pp. 371-385 (Aug. 11, 2000).
Raivio, "Transport Protocol Evolution in 3G Networks," World Telecommunications Congress/ISS2000, pp. 1-11 (Aug. 5, 2000).
International Search Report in International Application No. PCT/US00/15561 (Aug. 2, 2000).
Official Action for U.S. Appl. No. 09/205,809 (Jun. 22, 2000).
Loughney, "IP-Based Signaling Needs in Radio Access Networks," Internet draft, draft-loughney-sigtran-ip-ran-00.txt, IETF SIGTRAN Working Group, p. 1-14, (Jun. 16, 2000).
"GPRS: General Packet Radio Service," Usha Communications Technology, pp. 1-23 (Jun. 2000).
Interview Summary for U.S. Appl. No. 09/205,809 (Apr. 14, 2000).
Loughney et al., "SS7 SCCP-User Adaptation Layer (SUA)," Internet draft, draft-loughney-sigtran-sua-00.txt, IETF Engineering Task Force, p. 1-46, (Mar. 8, 2000).
Official Action for U.S. Appl. No. 09/205,809 (Feb. 2, 2000).
"Universal Mobile Telecommunications System (UMTS); UTRAN lu Interface: General Aspects and Principles (3G TS 25.410 version 3.1.0 Release 1999)," ETSI, pp. 1-2 (Jan. 2000).
3rd Generation Partnership Project (3GPP), "Technical Specification Group Radio Access Network—UTRAN Overall Description," 3G TS 25.401 version 3.1.0, Release 1999, p. 1-34, (Dec. 17, 1999).

3rd Generation Partnership Project (3GPP), "Technical Specification Group Radio Access Network—UTRAN lu Interface: General Aspects and Principles," 3G TS 25.410 version 3.1.0, Release 1999, p. 1-23, (Dec. 12, 1999).
Arango et al., "Media Gateway Control Protocol (MGCP), Version 1.0," Vertical Networks, RFC 2705, pp. 1-126 (Oct. 1999).
Ong et al., "Framework Architecture for Signaling Transport," Network Working Group, pp. 1-24 (Oct. 1999).
ITU-T Recommendation Q.2630.1 (Sep. 29, 1999).
ITU-T Recommendation Q.2150.1 (Jun. 23, 1999).
U.S. Appl. No. 60/132,552 for "Signal Transfer Point with Virtual Backplane" (May 5, 1999).
Handley et al., "SIP: Session Initiation Protocol," Internet Draft, Network Working Group, pp. 1-141 (Mar. 1999).
U.S. Appl. No. 60/110,398 for "Signaling Link with Inherent Redundancy," (Dec. 1, 1998).
Glaude et al., "SS7 to IP Signaling Gateway Transport Architecture", Internet Engineering Task Force, pp. 1-39 (Nov. 27, 1998).
Cuervo et al., "SSS-Internet Interworking—Architectural Framework," pp. 1-9 (Jul. 1998).
Yang et al., "The Design and Implementation of a Service Logic Execution Environment Platform," IEEE, pp. 1911-1917 (1993).
El-Toumi et al., "Interconnecting SS7 Signaling Networks," AT&T Bell Laboratories, IEEE, pp. 589-593 (1990).
Ex Parte Remark, 1990 WL 354512 (Bd.Pat.App. & Interf. 1990).
Henry Mfg. Co. Inc. v. Commercial Filters Corp, 350 F.Supp. 1015 (S.D. Indiana 1971).
Official Action for U.S. Appl. No. 11/184,632 (Sep. 26, 2008).
Official Action for U.S. Appl. No. 11/180,028 (Sep. 4, 2008).
Official Action for U.S. Appl. No. 11/130,422 (Aug. 14, 2008).
Notice of Allowance and Fee(s) Due for U.S. Appl. No. 11/184,439 (Jul. 30, 2008).
Notice of Allowance and Fee(s) Due for U.S. Appl. No. 11/224,705 (Jul. 17, 2008).
Communication pursuant to Article 94(3) EPC for European Application No. 00920080.9 (Jun. 27, 2008).
Official Action for U.S. Appl. No. 11/282,966 (Jun. 23, 2008).
Communication pursuant to Article 94(3) EPC for European Application No. 02705919.5 (May 27, 2008).
Official Action for U.S. Appl. No. 11/180,028 (May 5, 2008).
Official Action in U.S. Appl. No. 11/184,632 (Apr. 25, 2008).
Interview Summary for U.S. Appl. No. 11/224,705 (Mar. 25, 2008).
Communication pursuant to Article 94(3) EPC for European Application No. 07119613.3 (Mar. 17, 2008).
Supplementary European Search Report for European Application No. 00920080.9 (Feb. 14, 2008).
Extended European Search Report corresponding to European Patent No. 07119613.3 (Nov. 30, 2007).
Notice of Allowance and Fee(s) Due for U.S. Appl. No. 10/403,460 (Nov. 2, 2007).
Official Action for U.S. Appl. No. 11/224,705 (Sep. 28, 2007).
Communication pursuant to Article 96(2) EPC for European Application No. 06005210.7 (Sep. 6, 2007).
Notice of Allowance and Fee(s) Due for U.S. Appl. No. 09/770,316 (Aug. 13, 2007).
Official Action for U.S. Appl. No. 10/403,460 (May 11, 2007).
Notice of Allowance and Fee(s) Due for U.S. Appl. No. 10/403,455 (May 9, 2007).
Communication pursuant to Article 96(2) EPC for European Application No. 06122282.4 (Apr. 11, 2007).
Communication pursuant to Article 96(2) EPC for European Application No. 00950411.9 (Mar. 2, 2007).
Supplementary European Search Report for European Application No. 05763616.9 (Feb. 4, 2009).
Notice of Allowance and Fee(s) Due for U.S. Appl. No. 11/184,439 (Dec. 29, 2008).
Notice of Allowance and Fee(s) Due for U.S. Appl. No. 10/890,779 (Dec. 15, 2008).
Interview Summary for U.S. Appl. No. 11/184,632 (Dec. 5, 2008).
Interview Summary for U.S. Appl. No. 10/890,779 (Nov. 4, 2008).
Communication pursuant to Article 94(3) EPC for European Application No. 01 939 711.6 (Nov. 4, 2008).
Official Action for U.S. Appl. No. 10/890,779 (May 2, 2008).

Official Action for U.S. Appl. No. 10/890,779 (Sep. 20, 2007).
Notification of European Publication Number and Information on the Application of Article 67(3) EPC for European Application No. 05763616.9 (Mar. 21, 2007).
Communication pursuant to Rules 109 and 110 EPC for European Application No. 05763616.9 (Mar. 1, 2007).
Notification of Transmittal of the International Search Report and the Written Opinion of the International Searching Authority, or the Declaration in International Application No. PCT/US05/23456 (May 10, 2006).
Telcordia Technologies Specification of Signaling System No. 7, "Annex A: SS7 Message Priorities," GR-246-CORE, Issue 8 (Dec. 2003).
Nichols et al., "Definition of the Differentiated Services Field (DS Field) in the IPv4 and IPv6 Headers," Internet Engineering Task Force RFC 2474, pp. 1-20 (1998).
Almquist, "Type of Service in the Internet Protocol Suite," Internet Engineering Task Force RFC 1349, pp. 1-28 (Jul. 1992).
Internet Engineering Task Force RFC 791, University of Southern California, "Internet Protocol DARPA Internet Program Protocol Specification," pp. 1-45 (Sep. 1981).
Notice of Allowance and Fee(s) Due for U.S. Appl. No. 11/184,632 (Apr. 17, 2009).
Official Action for U.S. Appl. No. 11/986,493 (Jun. 9, 2009).
Decision to Grant a European Patent pursuant to Article 97(1) EPC for European Patent No. 1755295 (Jun. 5, 2009).
Supplemental Notice of Allowability for U.S. Appl. No. 11/184,632 (Sep. 25, 2009).
Notice of Allowance and Fee(s) Due for U.S. Appl. No. 11/282,966 (Sep. 24, 2009).
Communication Regarding the Expiry of the Time Limit Within which Notice of Opposition may be Filed for European Patent No. 1314324 (Jul. 1, 2009).
Supplemental Notice of Allowability for U.S. Appl. No. 11/282,966 (Nov. 16, 2009).
Communication under Rule 71(3) EPC for European Application No. 06 005 210.7 (Sep. 24, 2009).
Communication Regarding the Expiry of the Time Limit Within which Notice of Opposition may be Filed for European Patent No. 1755295 (May 6, 2010).
Plaintiff Tekelec's Answer to Defendant Performance Technologies, Incorporated's Counterclaims in the United States District Court for the Eastern District of North Carolina, Western Division, for Civil Action No. 09-CV-00531 (May 6, 2010).
Performance Technologies, Inc.'s Answer and Counterclaims to Tekelec's First Amended Complaint in the United States District Court for the Eastern District of North Carolina, Western Division, for Civil Action No. 09-CV-00531 (Apr. 15, 2010).
Communication pursuant to Article 94(3) EPC for European Application No. 05 763 616.9 (Apr. 14, 2010).

First Amended Complaint for Patent Infringement (Jury Trial Demanded) in the United States District Court for the Eastern District of North Carolina, Western Division, for Civil Action No. 09-CV-00531 (Mar. 3, 2010).
Communication under Rule 71(3) EPC for Application No. 01 939 711.6 (Feb. 9, 2010).
Complaint for Patent Infringement (Jury Trial Demanded) in the United States District Court for the Eastern District of North Carolina, Western Division, for Civil Action No. 09-CV-00531 (Dec. 9, 2009).
Notice of Allowance and Fee(s) Due for U.S. Appl. No. 09/443,712 (Dec. 30, 2005).
Interview Summary for U.S. Appl. No. 09/443,712 (Jun. 25, 2003).
Written Opinion for International Application No. PCT/US01/17483 (May 14, 2003).
Decision to Grant a European Patent pursuant to Article 97(1) EPC for European Patent No. 1356686 (Jun. 24, 2010).
Commonly-assigned, co-pending U.S. Appl. No. 12/950,688 for "Methods and Systems for Communicating Signaling System 7 (SS7) User Part Messages Among SS7 Signaling Points (SPs) and Internet Protocol (IP) Nodes Using Signal Transfer Points (STPs)," (Unpublished, filed Nov. 19, 2010).
Communication under Rule 71(3) EPC for Application No. 00 920 080.9 (Sep. 28, 2010).
Performance Technologies, Inc.'s Preliminary Invalidity Contentions Pursuant to Local Civil Rule 303.3 in the United States District Court for the Eastern District of North Carolina, Western Division, for Civil Avtion No. 09-CV-00531-BO (Aug. 19, 2010).
Communication regarding the expiry of the time limit within which notice of opposition may be filed for European Application No. 02705919.5 (May 25, 2011).
Communication regarding the expiry of the time limit within which notice of opposition may be filed for European Application No. 01939711.6 (May 18, 2011).
Stipulation of Dismissal in the United States District Court for the Eastern District of North Carolina, Western Division, for Civil Action No. 5:09-CV-00531 (May 4, 2011).
Non-Final Official Action for U.S. Appl. No. 11/986,500 (Apr. 1, 2011).
Communication regarding the expiry of the time limit within which notice of opposition may be filed for European Application No. 06005210.7 (Jan. 10, 2011).
Communication under Rule 71(3) EPC for European Application No. 05 763 616.9 (Jan. 13, 2012).
Final Official Action for U.S. Appl. No. 11/986,500 (Oct. 20, 2011).
Communication pursuant to Article 94(3) EPC for European Application No. 01 928 718.4 (Jun. 27, 2011).
Communication under Rule 71(3) EPC for European Application No. 07 119 613.3 (Apr. 28, 2011).
Sidebottom et al., "SS7 MTP3-User Adaptation Layer (M3UA)," Internet Draft, draft-ietf-sigtran-m3ua-02.txt, Network Working Group, pp. 1-56 (Mar. 10, 2000).

* cited by examiner

METHODS AND SYSTEMS FOR COMMUNICATING SS7 MESSAGES OVER PACKET-BASED NETWORK USING TRANSPORT ADAPTER LAYER INTERFACE

RELATED APPLICATIONS

This application is a divisional of U.S. patent application Ser. No. 09/588,852 filed Jun. 6, 2000 now U.S. Pat. No. 7,002,988, which is a continuation-in-part of U.S. patent application Ser. No. 09/443,712 filed Nov. 19, 1999 now U.S. Pat. No. 7,050,456, which is a continuation-in-part of U.S. patent application Ser. No. 09/205,809 filed Dec. 4, 1998 (now U.S. Pat. No. 6,324,183), and further claims the benefit of U.S. Provisional Application Ser. No. 60/137,988 filed Jun. 7, 1999, the disclosures of each of which are incorporated herein by reference in their entireties.

TECHNICAL FIELD

The present invention relates to methods and systems for communicating SS7 messages over a packet-based network. More particularly, the present invention relates to methods and systems for communicating SS7 messages over a packet-based network using a transport adapter layer interface (TALI).

BACKGROUND ART

The traditional public switched telephone network (PSTN) consists of signaling nodes connected via dedicated signaling system 7 (SS7) signaling links. The three primary types of signaling nodes in the conventional PSTN network are service switching points (SSPs), signal transfer points (STPs), and service control points (SCPs). Service switching points are end office switches that handle both voice and data traffic. Signal transfer points are switching nodes that route SS7 messages between SS7 signaling points. Service control points are databases and associated computers that provide data in response to SS7 queries. Examples of such data include billing information, 800 number translation information, and number portability information.

These conventional SS7 nodes have typically communicated by sending SS7 messages to each other over dedicated SS7 signaling links. While such signaling links provide a highly reliable means for communicating SS7 traffic, SS7 signaling links provide only fixed bandwidth to a user regardless of the user's needs. As a result, users must install or lease sufficient call signaling bandwidth to handle peak or worst-case traffic conditions. Installing or leasing sufficient call signaling bandwidth for peak conditions is inefficient since peak conditions rarely occur. Moreover, because SS7 call signaling bandwidth is expensive, there exists a need for an alternative to dedicated SS7 signaling links.

FIG. 1 is a block diagram of the conventional PSTN network. In FIG. 1, SSPs 100 and 102 communicate with SSPs 104 and 106 through STPs 108, 110, 112, and 114. SCP database nodes 116 and 120 provide data in response to queries from SSPs 100, 102, 104 and 106 and/or from STPs 108, 110, 112, and 114. All of the lines interconnecting the nodes in FIG. 1 represent conventional SS7 signaling links. As stated above, such links are often under-utilized and are expensive to install or lease.

In packet-based networks, such as transmission control protocol/Internet protocol (TCP/IP) networks, bandwidth can be shared among multiple users. In addition, the growth and popularity of the global Internet have made components for such networks readily available and cost efficient. However, integrating the traditional PSTN network with a packet-based network, such as a TCP/IP network, creates a number of problems.

For example, one problem with sending traditional call signaling traffic over a TCP/IP network is that in a TCP/IP network, transmissions between a sender and a receiver are stream-oriented. That is, TCP software on a sending machine is not guaranteed to send data in the same boundaries defined by a sending application. The amount of data sent over a TCP connection depends on the window size advertised by the receiver, the number of bytes of data that have been acknowledged by the receiver, and the maximum segment size of the physical network connecting the sender and the receiver. Accordingly, the receiving application may not receive data in the same boundaries created by the sending application. Thus, when sending call signaling messages over a TCP/IP network, several messages may be combined in one TCP segment. Alternatively, a single call signaling message may be divided among multiple TCP segments. In conventional networks, it is the job of the receiving application to parse the incoming data stream and extract the individual packets. Such parsing is difficult and increases the complexity of application programs that utilize TCP.

Another problem with sending conventional call signaling messages over a TCP/IP connection is that the timeout period for disabling a connection in TCP is too long for call signaling applications. For example, some implementations of TCP include a keep-alive timer. The keep-alive timer is reset every time a TCP segment is received. When the timer expires, it causes one side of the connection to determine if the other side is still operating. No mechanism is specified in the TCP protocol specifications for determining whether the other side is operating. In addition, the timeout period for the keep-alive timer is on the order of minutes. Thus, one side of a connection could go down and the other side could wait for minutes before resetting the connection. Such a long timeout period wastes resources on the machine that is waiting for data from the other side and is unsuitable for telephony applications.

Yet another problem with integrating conventional telephony and packet-based networks, such as TCP/IP networks, is that TCP/IP requires lengthy handshake procedures for connection establishment and termination. For example, in order to establish a TCP connection, a client application sends a synchronization (SYN) packet to a server application. The server application then sends an acknowledgement (ACK) and a SYN back to the client. The client then sends an acknowledgement to the SYN+ACK from the server. During the initial exchange of SYN and ACK messages, the client and server exchange sequence numbers. Once the client sends acknowledgement to the SYN+ACK to the server, the TCP software on the client machine is in an open state in which data can be received from the server and data from the sending application can be sent to the server.

In order to terminate a TCP connection, when an application closes a connection, the TCP software associated with that application sends a FIN packet to the TCP software on the other side of the connection. The TCP software of the machine that receives the FIN sends an ACK to the FIN and informs the application that a FIN has been received. If the application is finished sending data, the application closes the connection. In response to the application close, the TCP software sends a FIN to the TCP software that sent the original FIN. In response to receiving the FIN, the TCP software sends an ACK. Once this ACK is sent, the connection is considered to be closed by both sides of the connection.

While TCP connection establishment and termination procedures have proven to be reliable and account for a variety of error conditions, such procedures are cumbersome and require many round trip times in order to complete. For example, in TCP connection establishment, a minimum of 1.5 round trip times is required. In the TCP connection termination scenario described above, at least two round trip times are required. In addition, TCP software on both sides of the connection is required to maintain state and perform additional processing during connection establishment and termination.

For all of these reasons, the number of occurrences of TCP connection establishment and termination procedures should be minimized. For example, if it is desired to upgrade software in a telephony device that currently communicates with a remote device over a TCP connection, the connection must be terminated. Connection termination requires the handshaking procedure discussed above. Once the software is upgraded, the connection must be reestablished. Connection reestablishment requires the three-way handshaking procedure described above. Thus, performing a software upgrade requires an initial TCP connection establishment, a TCP connection termination, followed by another TCP connection establishment. These procedures waste resources and should be minimized, especially in high-traffic telecommunications switches.

In light of all these difficulties associated with integrating conventional telephony networks, such as SS7 networks, and stream-oriented packet-based networks, such as TCP networks, there exists a need for novel methods and systems for integrating these networks that avoid at least some of the difficulties associated with the prior art.

DISCLOSURE OF THE INVENTION

The present invention includes methods and systems for communicating SS7 messages between signaling nodes over a packet-based network using a transport adapter layer interface. As used herein, the phrase transport adapter layer interface refers to an interface that resides above the transport layer in the TCP protocol stack that facilitates integration between the SS7 protocol stack and the TCP/IP protocol stack. Such an interface includes functionality for prohibiting and allowing communications over a socket without invoking conventional TCP connection establishment and termination handshaking procedures. In addition, the interface provides monitor and test messages that are respectively used to measure performance and test the status of a connection. The interface also provides a mechanism for encapsulating SS7 messages that allows individual message identification over a stream-oriented connection.

Embodiments of the invention will be described below as modules, layers, or processes for implementing SS7 and IP communications functions. It is understood that these modules, layers, or processes can be implemented as hardware or a combination of hardware and software. For example, transport adapter layer interface functionality is described below as a process implemented on a data communications module. The data communications module may include hardware, such as a microprocessor and associated memory, for executing and storing programs. The TALI process may be executed by the microprocessor to perform the TALI functions described below.

Accordingly, it is an object of the invention to provide novel methods and systems for communicating SS7 messages over a stream-oriented packet-based network that avoids the problems with conventional stream-oriented packet-based networks.

It is another object of the invention to provide methods and systems for allowing and prohibiting service data communications over a stream-oriented connection without invoking a TCP handshaking procedure.

It is yet another object of the invention to provide methods and systems for identifying message packets received over a stream-oriented connection.

Some of the objects of the invention having been stated hereinabove, other objects will be evident as the description proceeds, when taken in connection with the accompanying drawings as best described hereinbelow.

BRIEF DESCRIPTION OF THE DRAWINGS

Preferred embodiments of the invention will now be described with reference to the accompanying drawings of which.

DETAILED DESCRIPTION OF THE INVENTION

Figure 1:
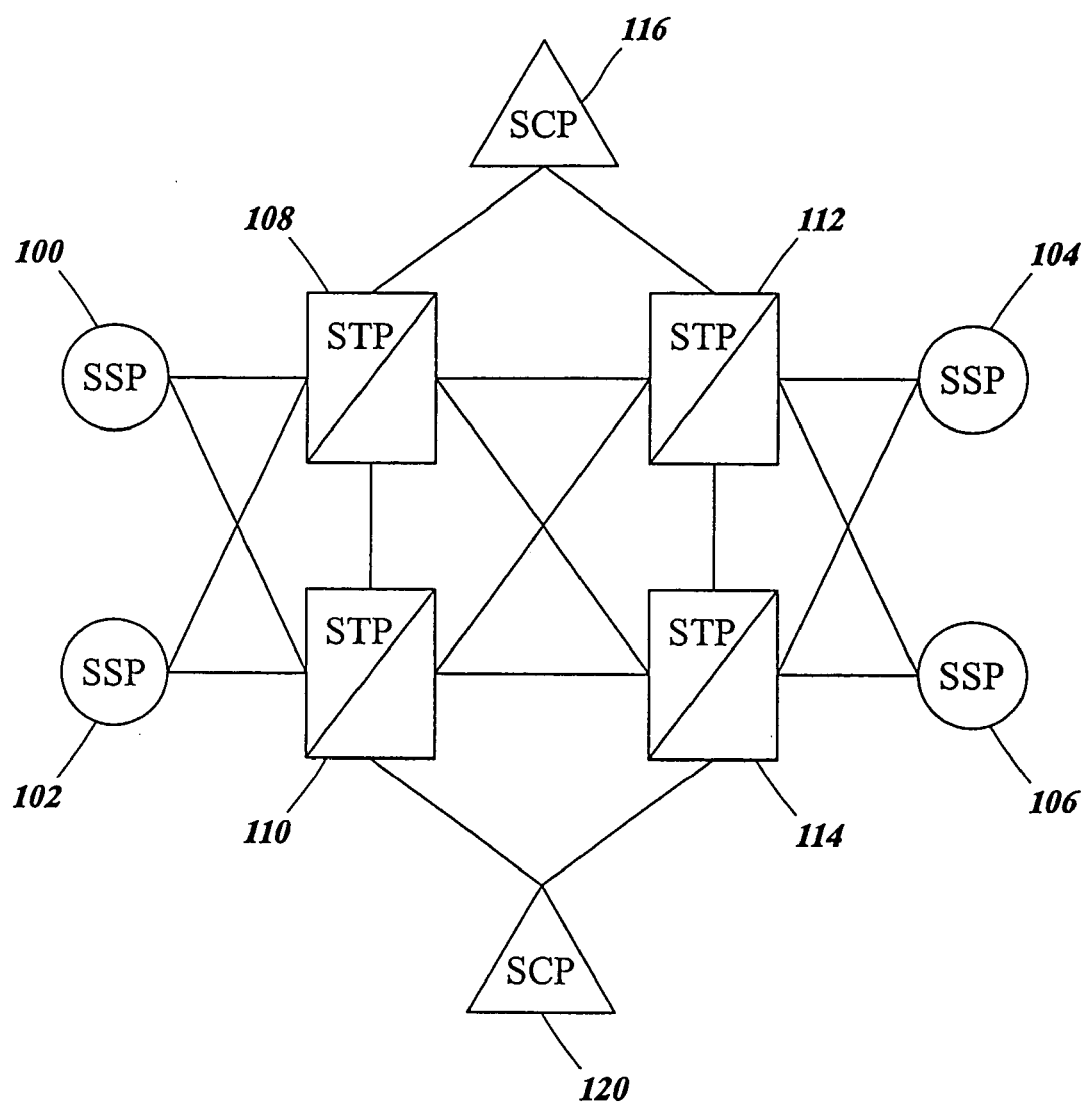
FIG. 1 is a block diagram illustrating the conventional PSTN network.
Figure 2:
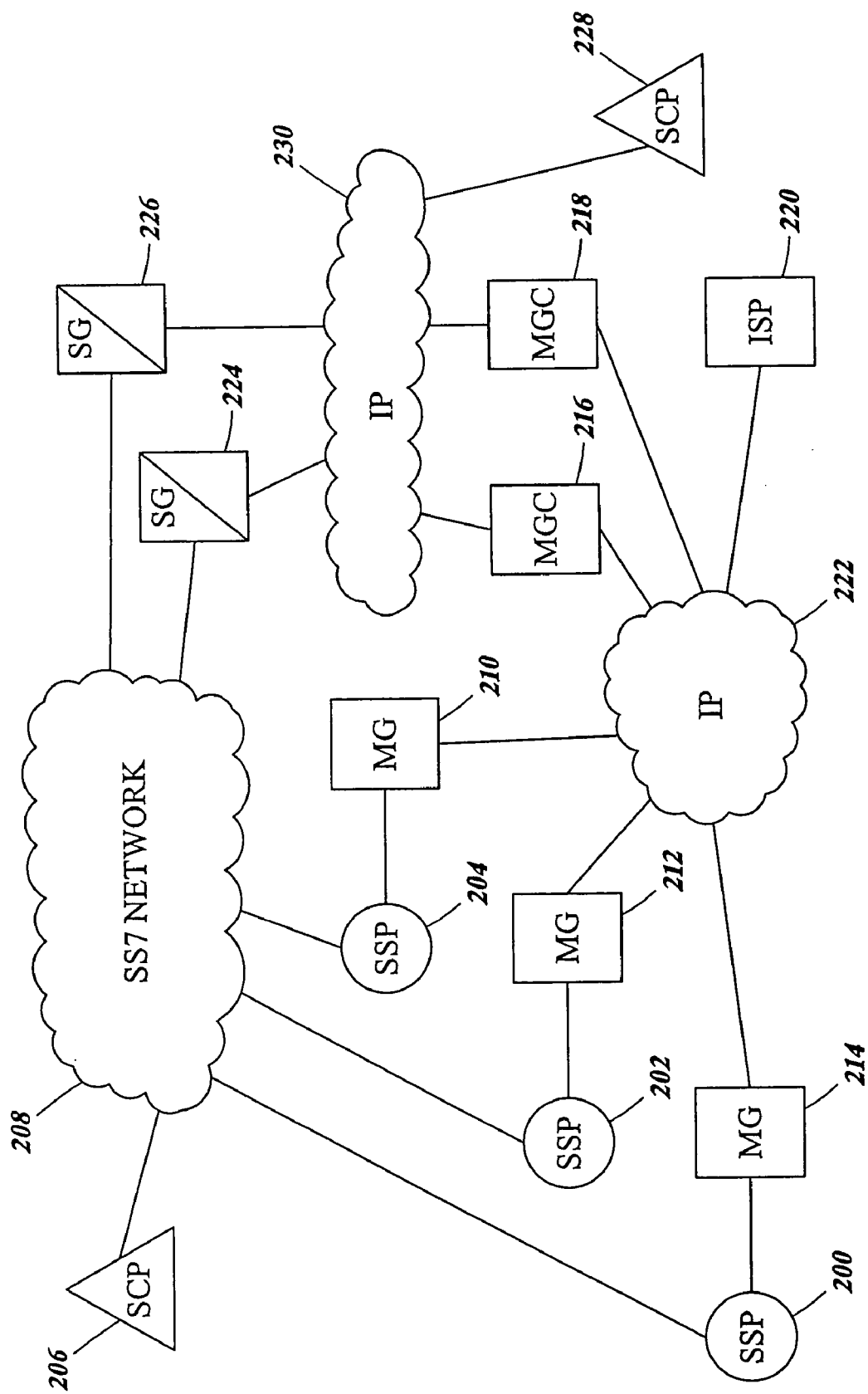
FIG. 2 is a block diagram of an exemplary operating environment for embodiments of the present invention.

FIG. 2 illustrates an exemplary operating environment for embodiments of the present invention. In FIG. 2, conventional SS7 network elements, such as SSPs 200, 202, and 204 and SCP 206, communicate with each other over SS7 network 208. IP nodes, such as media gateways (MGs) 210, 212, and 214, media gateway controllers (MGCs) 216 and 218 and Internet service provider (ISP) 220, communicate with each other over first packet-based network 222. Similarly, signaling gateways 224 and 226 communicate with MGCs 216 and 218 and with SCP 228 via second packet-based network 230. First and second packet-based networks 222 and 230 may each comprise IP networks. Moreover, first and second packet-based networks 222 and 230 may be the same logical network. The reason that networks 222 and 230 are illustrated separately in FIG. 2 is that first packet-based network 222 carries packetized media stream communications between MGs, and media control information between MGCs and MGs, and second packet-based network 230 carries call signaling traffic to and from SGs 224 and 226.

The conventional SS7 network elements, such as SSPs and SCPs, are described in detail above. Hence a description thereof will not be repeated herein. The additional network elements illustrated in FIG. 2 include media gateways 210, 212, and 214, media gateway controllers 216 and 218, signaling gateways 224, and 226, and Internet service provider (ISP) 220. Media gateways 210, 212, and 214 encapsulate media stream communications, such as audio, video, and data, in IP packets to be transmitted over first packet-based network 222. An example of a protocol used to send media stream communications over a packet-based network is the real time protocol (RTP) as defined in *RFC 1889, RTP: A Transport Protocol for Real Time Applications*, Jacobson et al., January 1996.

MGCs 216 and 218 control MGs 210, 212, and 214 using a control protocol. An example of a control protocol that may be implemented by MGCs 216 and 218 is the media gateway control protocol as described in Media Gateway Control Protocol (MGCP), Feb. 21, 1999, available on the Internet Engineering Task Force (IETF) website. ISP 220 provides Internet services to subscribers. Accordingly, ISP 220 may include a network access server to provide user access to the Internet.

Signaling gateways 224 and 226 implement an interface between SS7 network 208 and second packet-based network 230. In a preferred embodiment of the invention, signaling gateways 224 and 226 provide a transport adapter layer interface to allow conventional network elements, such as SSPs 200, 202, and 204, to communicate with IP network elements, such as MGCs 216 and 218. However, the transport adapter layer interface is not limited to communications between SSPs and MGCs. For example, the transport adapter layer interface according to embodiments of the present invention may also be used to communicate call signaling messages to IP-based SCPs, such as SCP 228 and other devices equipped with an IP interface.

Figure 3:
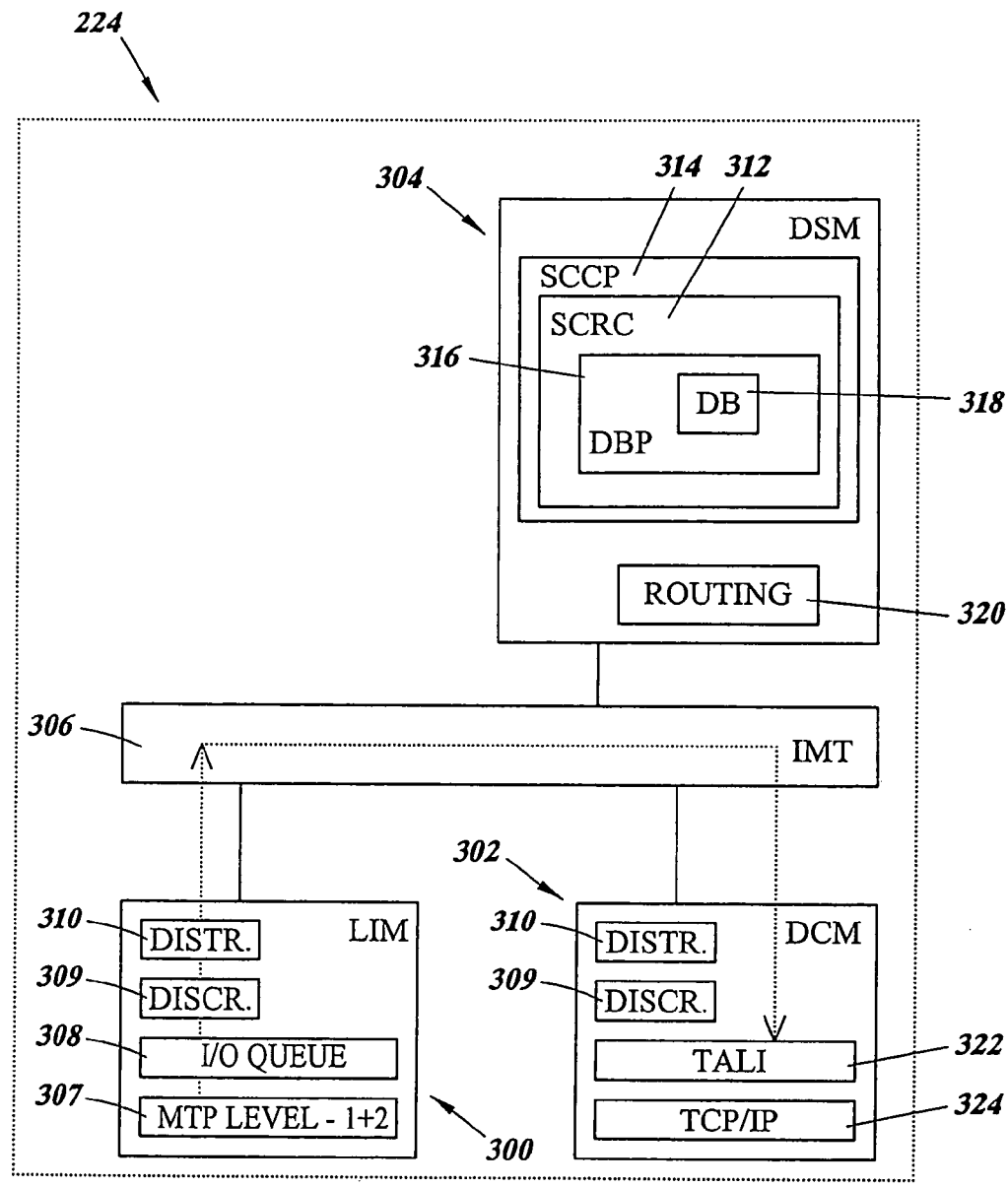
FIG. 3 is a block diagram of a signaling gateway capable of sending SS7 messages over a packet-based network using a transport adapter layer interface according to an embodiment of the present invention.

FIG. 3 is a block diagram illustrating a signaling gateway for implementing transport adapter layer interface functionality according to an embodiment of the present invention. In FIG. 3, signaling gateway 224 includes SS7 link interface module (LIM) 300 for sending and receiving SS7 messages over an SS7 network and data communications module (DCM) 302 for sending and receiving SS7 messages over one or more stream-oriented connections. Signaling gateway 224 may also include additional modules, such as database service module (DSM) 304, for providing SCCP and database services. Modules 300, 302 and 304 are connected by an interprocessor message transport (IMT) bus 306. IMT bus 306 is preferably a dual ring counter rotating bus for increased reliability.

Link interface module 300 includes a number of processes for sending and receiving SS7 messages over SS7 links. In the illustrated embodiment, link interface module 300 includes message transfer part (MTP) level 1 and 2 process 307 for performing SS7 layer 1 and 2 processing of incoming messages. I/O queue 308 enqueues incoming and outgoing SS7 messages. Message discrimination process 309 determines whether incoming messages are addressed to signaling gateway 224 or to another node. For example, message discrimination process 309 may analyze the SS7 destination point code in an incoming message to determine whether the message is addressed to signaling gateway 224 or to another node. If message discrimination process 309 determines that the message is addressed to signaling gateway 224, message discrimination process 309 forwards the message to message distribution process 310. Message distribution process 310 routes the message to another internal module for further processing.

DSM 304 provides database and SCCP service for SS7 messages. Accordingly, DSM 304 may include signaling connection routing control (SCRC) and SCCP processes 312 and 314 for interpreting SCCP layer information of incoming messages and routing the messages to database process 316. Database process 316 may perform a lookup in database 318 to obtain routing or other information for an incoming message. For example, database 318 may be a number portability database, a circuit identification code routing database, a billing code database, or other database for performing routing or other functionality. Routing process 320 routes the message to the appropriate module for outgoing processing based on MTP layer 3 information in the message.

DCM 302 includes transport adapter layer interface process 322 for performing transport adapter layer interface functionality. Such functionality includes encapsulating SS7 messages in a transport adapter layer interface packet to be sent over a stream-oriented connection, allowing and prohibiting communication over a stream-oriented connection, monitoring the other end of the stream-oriented connection, etc. DCM 302 preferably also includes a stream-oriented communication process such as TCP/IP process 324. TCP/IP process 324 performs conventional TCP/IP protocol stack functions. Such functions include reliable delivery of TCP/IP packets, flow control, packet sequencing, and other stream-oriented transport functionality.

Figure 4A:
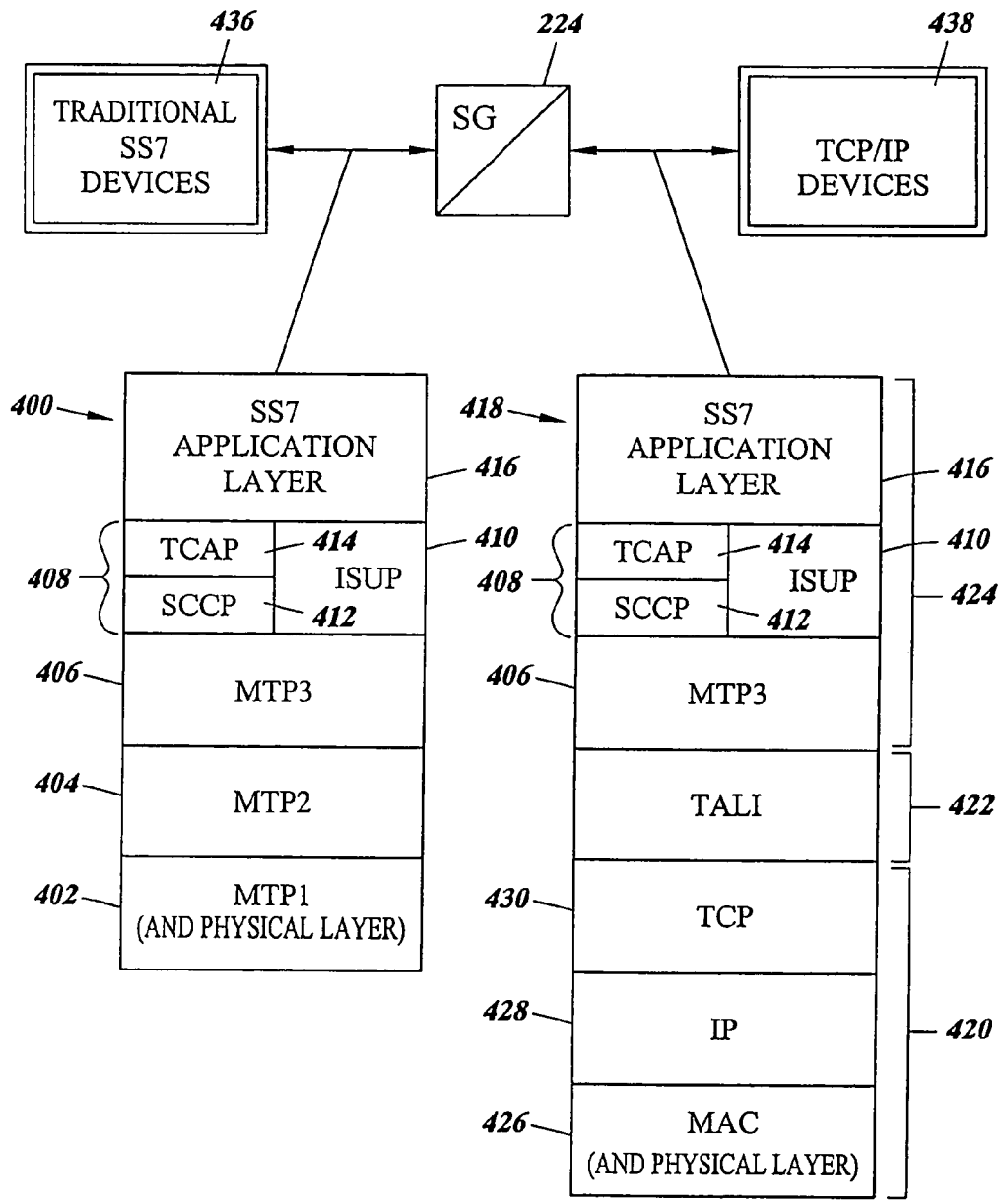
FIGS. 4(a) and 4(b) are block diagrams illustrating the relationships between the SS7 and IP protocol stacks and methods for integrating the protocol stacks using a transport adapter layer interface according to embodiments of the present invention.

FIG. 4(a) is a block diagram illustrating the relationships between the SS7 protocol stack and the transport adapter layer interface protocol stack according to an embodiment of the present invention. In FIG. 4, SS7 protocol stack 400 includes MTP layer 1 402, MTP layer 2 404, and MTP layer 3 406. MTP layer 1 402, also referred to as the physical layer, communicates with hardware to send and receive data over a physical medium. MTP layer 2 404, referred to as the data link layer, provides error correction/detection and properly sequenced delivery of SS7 message packets. MTP layer 3 406, also referred to as the network layer, is responsible for SS7 message routing, message discrimination, and message distribution.

Residing above MTPs layers 1-3 is the user parts and application parts layer 408. User parts and application parts layer 408 is divided into ISDN user part (ISUP) layer 410, signaling connection control part (SCCP) layer 412 and transaction capabilities application part (TCAP) layer 414. ISDN user part layer 410 performs SS7 call setup and call teardown functions. SCCP layer 412 performs signaling connection control part functions, such as database subsystem addressing. TCAP layer 414 is used for database transactions, such as 800 number translations, number portability transactions, and billing transactions. Finally, SS7 application layer 416 can perform any function that uses the underlying services provided by SS7. Examples of such applications include billing applications, network monitoring applications, etc.

TALI protocol stack 418 includes IP protocol stack portion 420, TALI portion 422, and SS7 portion 424. IP protocol stack portion 420 includes a physical and MAC layer 426, a network layer 428, and a transport layer 430. Physical and MAC layer 426 interfaces with network hardware for communication between connected machines and transports network frames between machines connected to the same network. Network layer 428 handles routing and addressing of datagrams between different physical networks. In a preferred embodiment of the invention, network layer 428 performs addressing and routing functions according to the Internet protocol, such as Internet protocol version 4 or Internet protocol version 6. Transport layer 430 provides communication between application programs. In a preferred embodiment of the present invention, transport layer 430 includes stream-oriented transport software, such as TCP software, for implementing reliable stream-oriented transport between applications.

It should be noted that although TALI protocol stack 418 illustrated in FIG. 4(a) includes MTP3 layer 406, MTP layer 3 functionality, other than processing point codes, is optional and may be omitted from TALI protocol stack 418.

According to an important aspect of the present invention, transport adapter layer interface portion 422 includes functions and packet structures that facilitate interoperability between the SS7 and TCP protocols. For example, transport adapter layer interface portion 422 includes packet structures that facilitate extraction of SS7 packets from a TCP data stream, commands for allowing and prohibiting connections without invoking TCP connection establishment and termination procedures, monitor messages for measuring round trip time, and test messages for determining whether a TCP connection is enabled or disabled. Each of these functions will be discussed in more detail below.

Traditional SS7 devices 436, such as SSPs, STPs, and SCPs, communicate with signaling gateway 224 using SS7 protocol stack 400. TCP/IP devices 438, such as MGCs and IP-based SCPs, communicate with signaling gateway 224 using TALI protocol stack 418. Accordingly, signaling gateway 224 preferably includes software for implementing both SS7 protocol stack 400 and TALI protocol stack 418.

As illustrated in FIG. 3, SS7 protocol stack 400 may be implemented by or on LIM 300 and TALI protocol stack 418 may be implemented by or on DCM 302. However, the present invention is not limited to such an implementation. For example, in an alternative embodiment of the invention, SS7 protocol stack 400 and TALI protocol stack 418 may be implemented on a single card or module within signaling gateway 224 or in another node in which SS7 and IP communication capability is desirable.

Figure 4B:
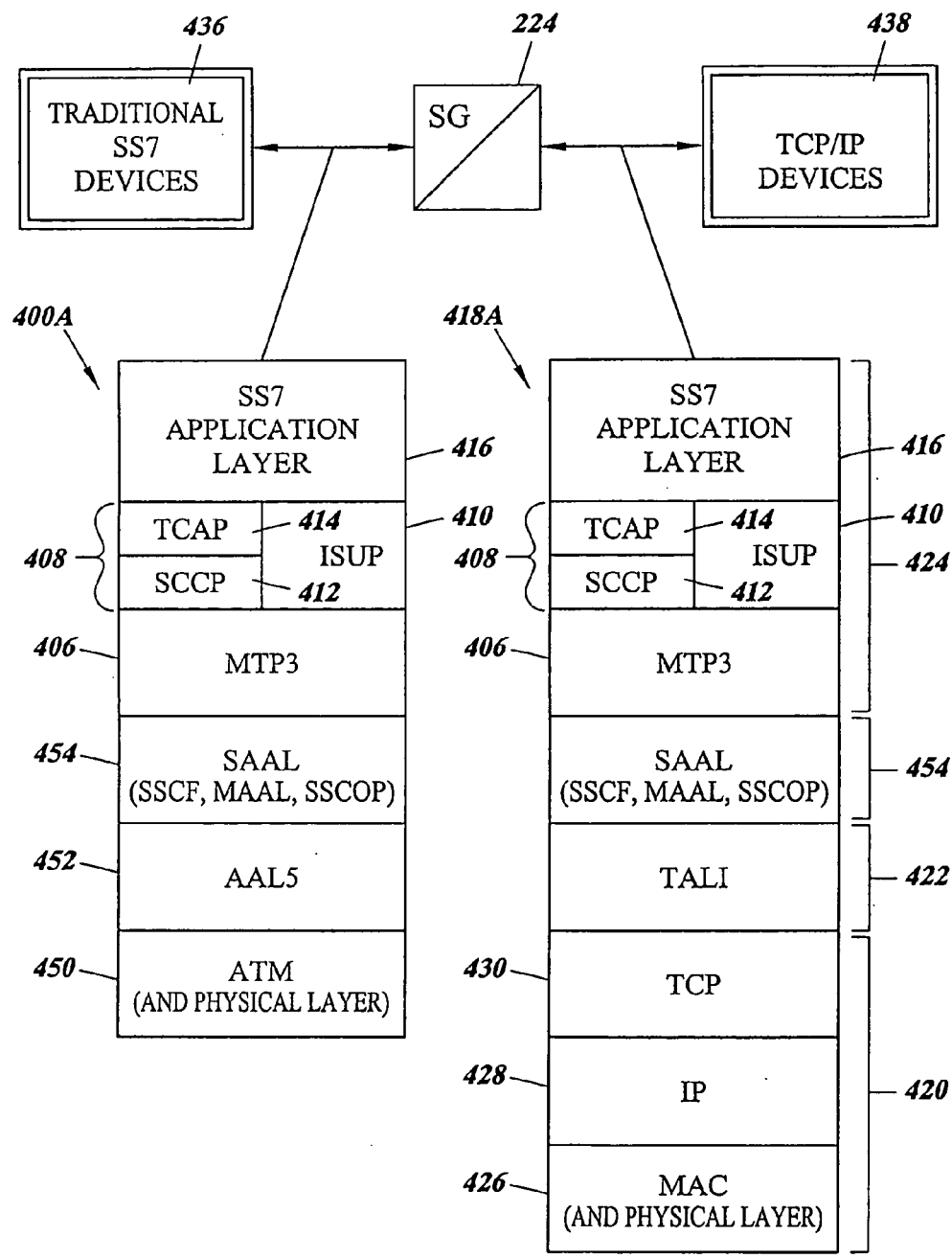

FIG. 4(b) is a block diagram illustrating an alternative implementation of the TALI protocol stack according to an embodiment of the present invention. In FIG. 4(b), SS7 protocol stack 400a includes MTP3, SCCP, TCAP, ISUP, and application layers 406, 412, 414, and 416 that are identical to the correspondingly numbered layers described with respect to FIG. 4(a). However, in FIG. 4(b) MTP layers 1 and 2 are replaced by asynchronous transport mode (ATM) layer 450, ATM adaption layer 5 452, and signaling ATM adaption layer 454. Layers 450, 452, and 454 perform functions for transmitting SS7 traffic over a broadband network, such as an ATM network.

TALI protocol stack 418a includes MAC, network, transport, TALI, and SS7 layers 426, 428, 430, 422, and 424, that are identical to the correspondingly numbered layers described with respect to FIG. 4(a). However, TALI protocol stack 418a includes signaling ATM adaption layer (SAAL) 454 to provide sequencing of SS7 data transferred across a TCP/IP connection. When TALI protocol stack 418a is implemented without SAAL layer 454, as illustrated in FIG. 4(a), the SS7 sequence number, which is included in the SS7 MTP2 header, is not transferred across a TCP/IP connection. This sequence number is used to preserve message sequencing and to support complex SS7 procedures involving message signal unit (MSU) retrieval during link changeover and changeback. Changeover is an SS7 procedure whereby a link request is sent over one SS7 link to move SS7 traffic from that link to another SS7 link. Changeback is an SS7 procedure for moving the SS7 traffic back to the original link. TALI protocol stack 418 illustrated in FIG. 4(a) without SAAL layer 454 still guarantees correct sequencing of SS7 data because TCP layer 430 provides sequencing of TCP segments that carry the SS7 traffic.

When TALI protocol stack 418a is implemented with SAAL layer 454, the sequence number of the SS7 MSU is part of the data transferred across a TCP/IP connection. This sequence number may be included as a header, a trailer, or in any other portion of a transport adapter layer interface packet. In the illustrated example, the sequence number is a 24-bit value included in a service specific connection oriented protocol (SSCOP) trailer provided by SML layer 454. This 24-bit sequence number serves the same purpose as the 8-bit SS7 sequence number. Accordingly, TALI protocol stack 418a illustrated in FIG. 4(b) can be used for SS7 changeover and changeback with data retrieval and can minimize MSU loss when SS7 links are deactivated.

SCCP Encapsulation Using TALI

Figure 5:
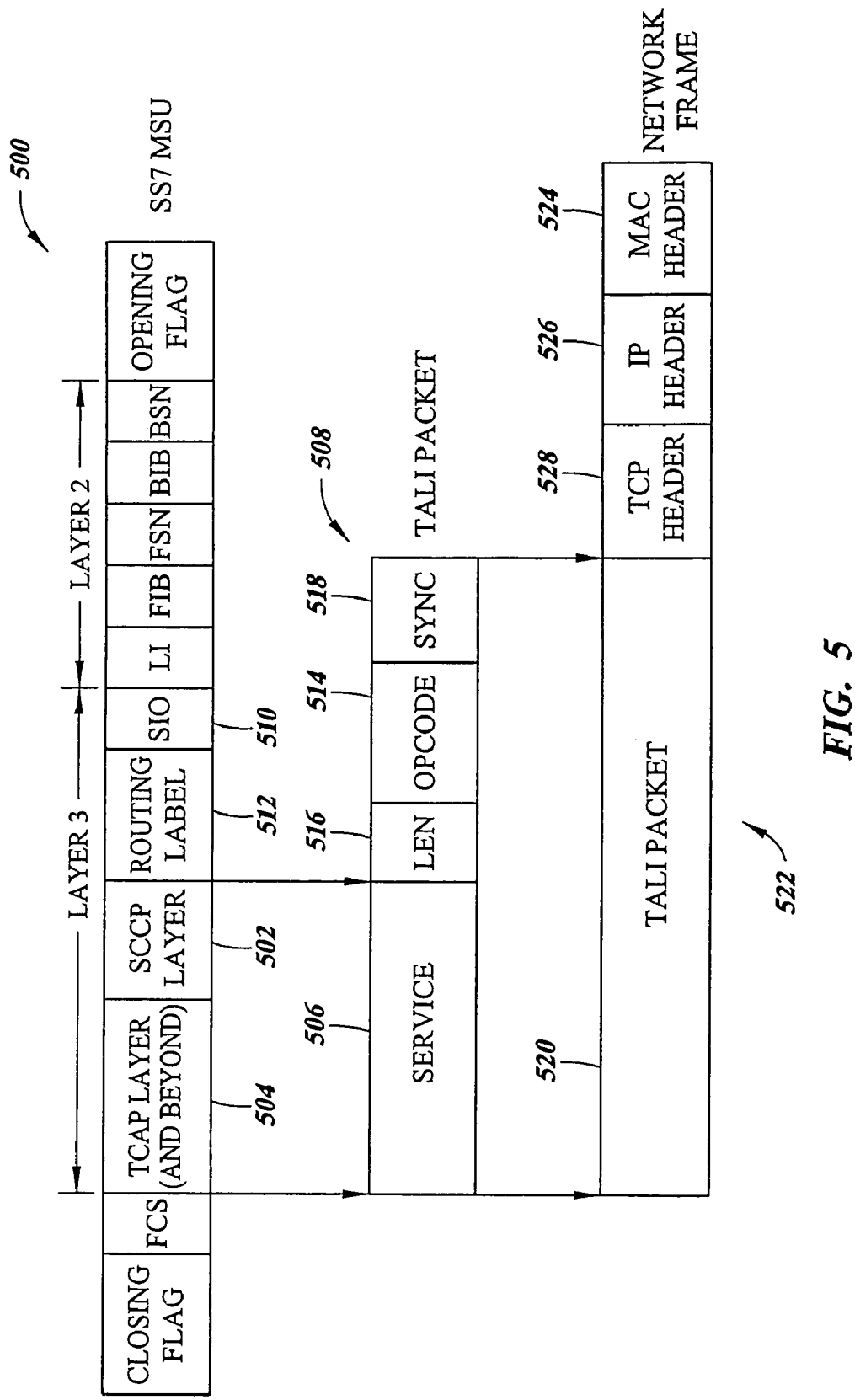
FIG. 5 is a block diagram illustrating an exemplary packet structure for encapsulating of SCCP messages using a transport adapter layer interface according to an embodiment of the present invention.

FIG. 5 illustrates a packet structure for encapsulating SCCP MSUs in IP packets using the transport adapter layer interface according to an embodiment of the present invention. In FIG. 5, SS7 MSU 500 includes SCCP layer information 502 and TCAP layer information 504 that are encapsulated in service portion 506 of TALI packet 508. SS7 MSU 500 also includes service indicator octet 510 and routing label 512. In one embodiment of the invention, service indicator octet 510 and routing label 512 may be encapsulated directly in service portion 506 of TALI packet 508. However, in the illustrated embodiment, service indicator octet 510 and routing label 512 are omitted from TALI packet 508. Omitting the service indicator octet and routing label information from the TALI packet simplifies processing by the receiving TALI process.

Rather than encapsulating service indicator octet 510 and routing label 512 directly in service field 506 of TALI packet 508, TALI protocol software according to embodiments of the present invention may store information from SIO 510 and routing label 512 in other information fields. For example, the destination point code from routing label 512 may be stored in the SCCP called party point code field of SCCP layer 502. Similarly, the originating point code from routing label 512 may be stored in the SCCP calling party point code field of routing label 512. Message type identification information from SIO 510 may be merged to OPCODE field 514 of TALI packet 508. For example, OPCODE field 514 may store information for identifying the message type. In the illustrated embodiment, OPCODE field 514 may be set to a predetermined value for identifying the message as an SCCP message. The remaining fields of SS7 MSU 500 are preferably omitted from TALI packet 508. That is, SS7 layer 2 information, opening flags, closing flags, and frame check sequences are preferably omitted from TALI packet 508. This information can be omitted because the TCP/IP protocol stack provides analogous functions to SS7 layers 1 and 2. Omitting SS7 layers 1 and 2 from TALI packet 508 decreases overhead for sending packets over a network.

In addition to service field 506 and OPCODE field 514, TALI packet 508 also includes LENGTH field 516 and SYNC field 518. LENGTH field 516 specifies the length of the service portion of the data packet. SYNC field 518 contains a predetermined bit sequence for identifying the start of TALI packet 508. LENGTH field 516 and SYNC field 518 may be used by receiving TALI protocol software to extract individual TALI packets from a stream-oriented connection. Thus, the TALI packet structure in FIG. 5 solves the problem of receiving data over a stream-oriented communication and delivers individual TALI packets to an application. This simplifies application design, as will be discussed in more detail below.

TALI packet 508 is encapsulated in data portion 520 of network frame 522. Network frame 522 may be any suitable frame for delivering packets to machines connected to the same network. For example, network frame 522 may be an Ethernet frame. Accordingly, network frame 522 includes a mediated access control (MAC) header 524. IP header 526 follows MAC header 524. Finally, TCP header 528 follows IP header 526. The structure of headers 524, 526, and 528 is known to those of ordinary skill in the art and need not be described herein.

Figure 6:
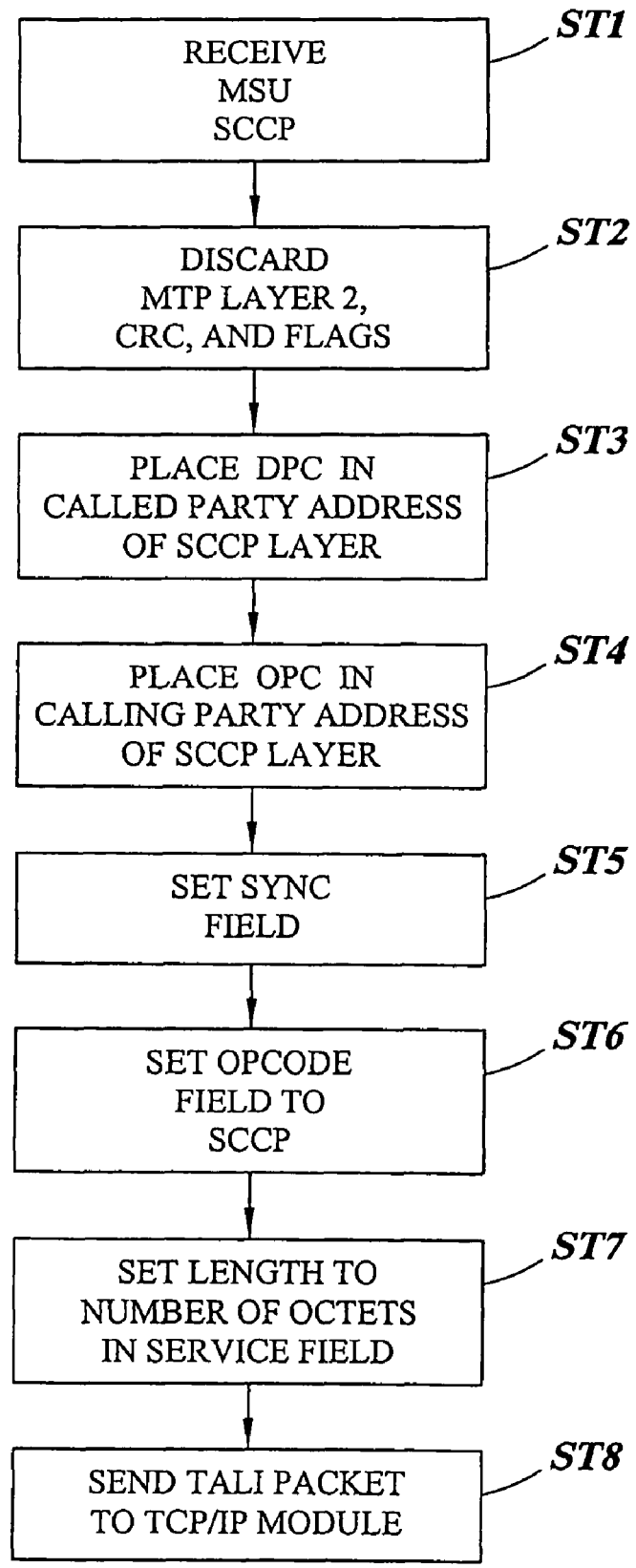
FIG. 6 is a flowchart illustrating exemplary steps that may be performed by a signaling gateway in encapsulating SCCP messages using a transport adapter layer interface according to an embodiment of the present invention.

FIG. 6 is a flowchart illustrating exemplary steps that may be performed by TALI process 322 illustrated in FIG. 3 for performing TALI encapsulation of an SCCP MSU. In FIG. 6, in step ST1, TALI process 322 receives an SS7 MSU. The SS7 MSU may originate from an SS7 node, such as an SSP. In step ST2, TALI process 322 discards MTP layer 2 information, SRC, and flags from the SCCP MSU. In step ST3, TALI process 322 places the destination point code from the routing layer into the called party address field of the SCCP layer. In step ST4, TALI process 322 places the originating point code from the routing label in the calling party address field of the SCCP layer. It is understood that steps ST3 and ST4 are optional and can be omitted if the entire MTP3 portion of the SCCP MSU is encapsulated in the service portion of the TALI packet.

In step ST5, TALI process 322 sets the SYNC field in the header of the TALI packet to indicate the beginning of the TALI packet. In ST6, TALI process 322 sets the OPCODE field of the TALI packet to SCCP. In step ST7, TALI process 322 sets the LENGTH field is set to the number of octets in the service field of the TALI packet. Finally, in step ST8, TALI process 322 sends the packet to TCP/IP process 324 for TCP/IP encapsulation and transmission to an external node.

The steps for processing an incoming TALI packet are essentially the reverse of the steps illustrated in FIG. 6. Novel steps for processing incoming TALI packets will be discussed in more detail below in the section entitled "Identifying Individual Message Packets Received Over Stream-Oriented Connection."

MTP3 Encapsulation Using TALI

Figure 7:
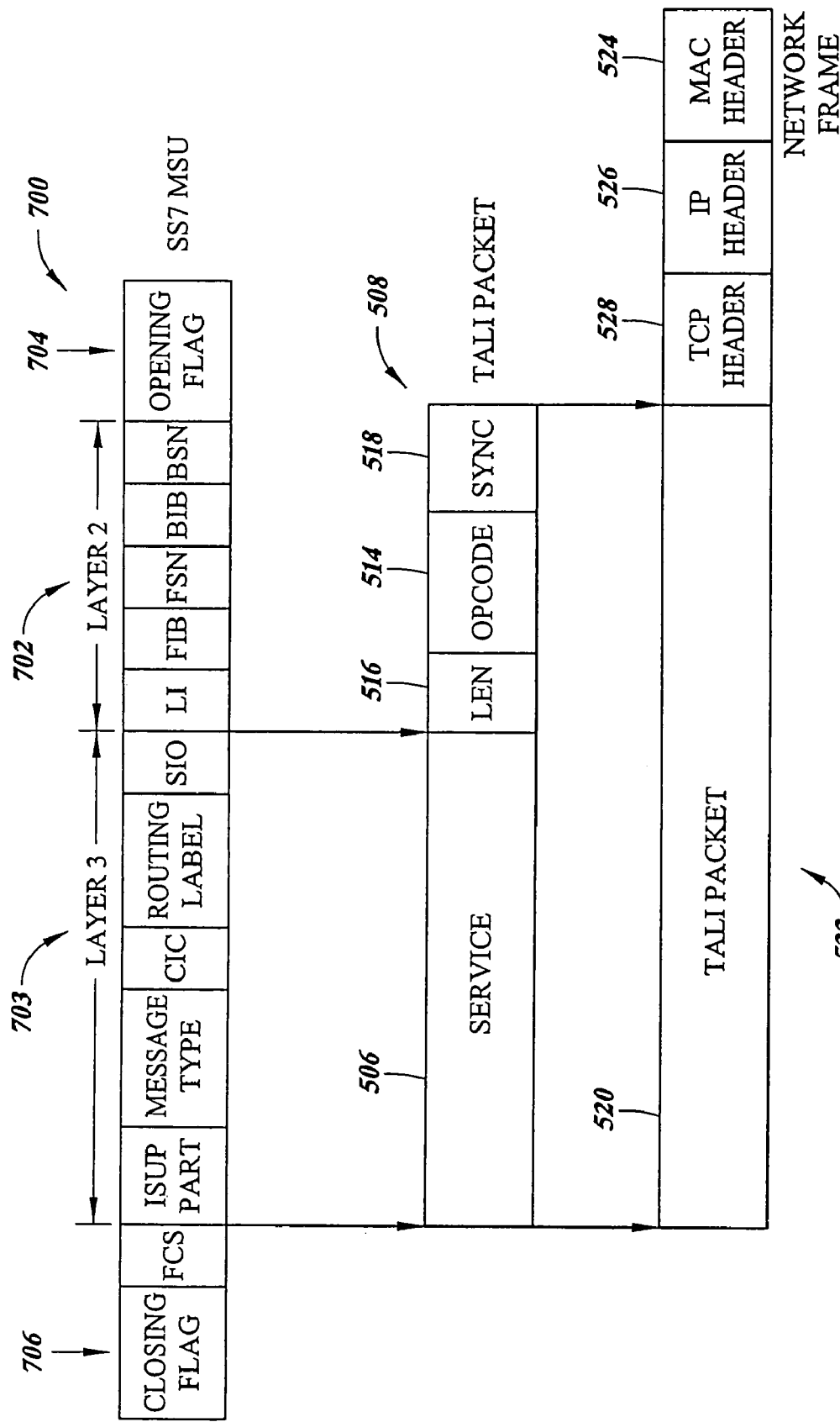
FIG. 7 is a block diagram illustrating an exemplary packet structure for encapsulating MTP3 messages using a transport adapter layer interface according to an embodiment of the present invention.

FIG. 7 is a block diagram illustrating an exemplary packet structure for encapsulating MTP3 messages in IP packets according to a preferred embodiment of the present invention. As used herein, an MTP3 message is an SS7 message that is not an SCCP or an ISUP message. These messages correspond to service indicator values of 0-2, 4, and 6-15. In FIG. 7, SS7 MSU 700 includes layer 2 702, layer 3 703, and opening and closing information 704 and 706. Unlike the example illustrated in FIG. 5, in this example, all of layer 3 information is encapsulated in service portion 506 of TALI packet 508. Like the example illustrated in FIG. 5, layer 2 information 702, and opening and closing information 704 and 706 are preferably discarded.

In TALI packet 508, LENGTH field 516 is set to the length of service portion 506. OPCODE field 514 is set to a predetermined value for identifying an MTP3 packet. SYNC field 518 is set to a predetermined value for identifying the start of TALI packet 508. TALI packet 508 is encapsulated in network frame 522 in the same manner described above with respect to FIG. 5. Thus, the present invention provides a method for encapsulating MTP3 messages other than ISUP and SCCP messages in network frames using a transport adapter layer interface.

SML Encapsulation Using TALI

As illustrated above with regard to FIG. 4(*b*), one embodiment of the transport adapter layer interface protocol stack includes a SAAL layer. TALI also provides a corresponding SML OPCODE that indicates that a SAAL message is being transported. This OPCODE may be used to transport any type of SS7 message, including ISUP messages, SCCP messages, and MTP3 messages that includes SAAL information. In addition, the SAAL OPCODE may be used to transport non-SS7 messages, such as SML peer-to-peer messages.

Figure 8:
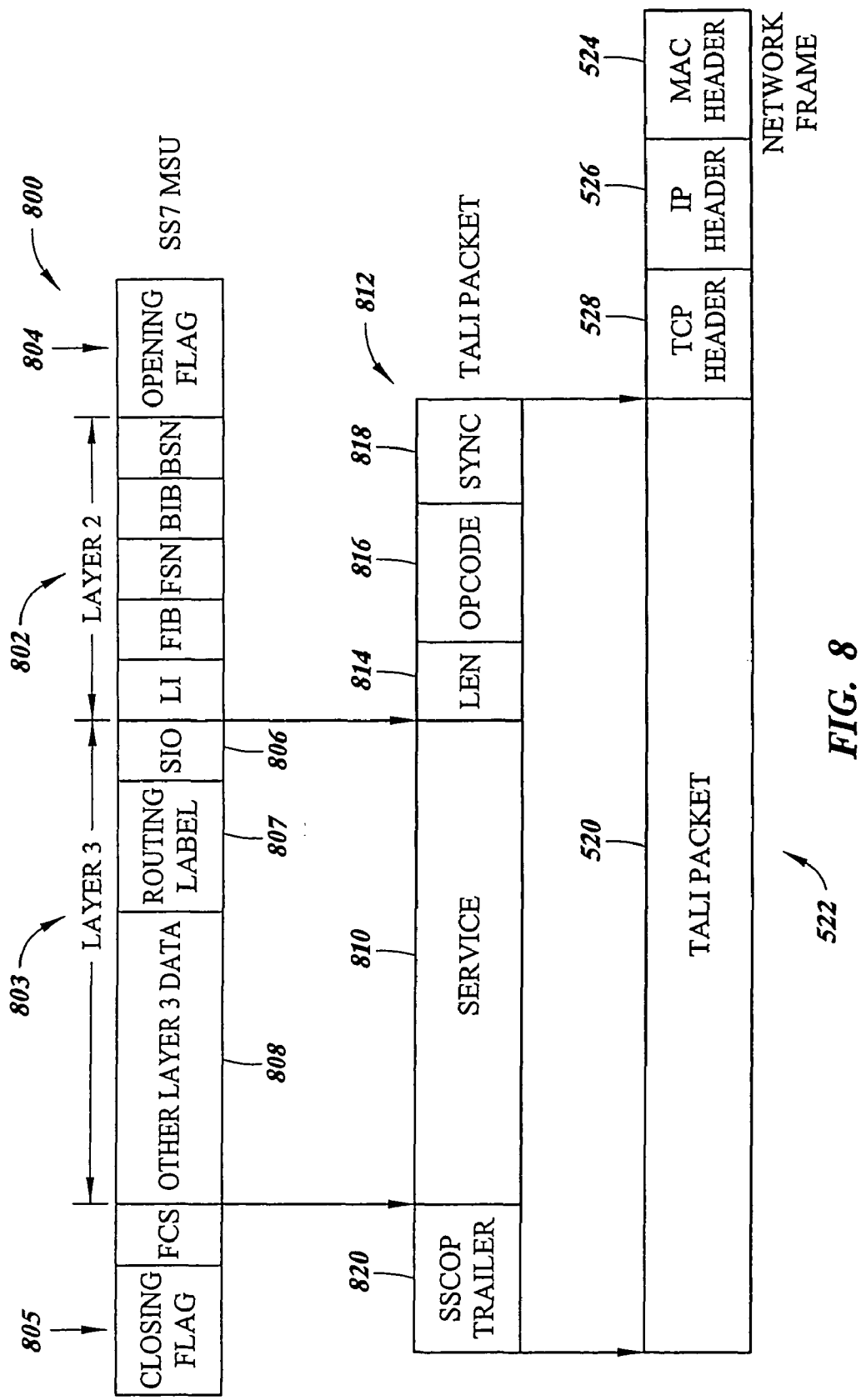
FIG. 8 is a block diagram illustrating an exemplary packet structure for encapsulating SS7 messages using an ATM adaption layer and a transport adapter layer interface according to an embodiment of the present invention.

FIG. 8 illustrates encapsulation of SAAL messages using a transport adapter layer interface according to an embodiment of the present invention. In FIG. 8, SS7 MSU 800 includes layer 2 and layer 3 portions 802 and 803 and opening and closing portions 804 and 805, as previously described. Layer 3 portion 802 includes an SIO value 806, a routing label 807, and other layer 3 information 808. Other layer 3 information 808 can include ISUP information, application part information, or MTP3 information, as previously described. In the illustrated embodiment, all of layer 3 information 803 is encapsulated in service portion 810 of TALI packet 812.

TALI packet 812 includes LENGTH field 814, OPCODE field 816, and SYNC field 818. In addition, TALI packet 812 includes SSCOP trailer 820. LENGTH field 814 specifies the number of octets in service portion 810, OPCODE field 816 is set to a predetermined value for identifying TALI packet 812 as a SAAL packet, and SYNC field 818 is set to a predetermined value for indicating the beginning of TALI packet 812. SSCOP trailer 820 contains a sequence number for sequencing TALI service data packets when a TCP/IP link fails. TALI packet 812 is encapsulated in network frame 522 in the manner described above. SML decapsulation can occur in a manner similar to that described above with respect to FIG. 6 if service portion 810 of TALI packet 812 contains an SS7 MSU. If service portion 810 of TALI packet 812 contains a SAAL peer-to-peer message, decapsulation may be performed by the SML layer, rather than the TALI layer.

TALI State Machine

Table 1 shown below is a state machine for the TALI protocol. In Table, 1, columns represent protocol states and the rows represent events that may or may not cause transitions between protocol states. Blank cells in the table indicate that no action occurs for a given state in response to a given event. Cells with text indicate functions performed by TALI protocol implementations and state transitions that occur in response to events.

The states in the TALI protocol are: out-of-service (OOS), connecting, near end prohibited—far end prohibited (NEP-FEP), near end prohibited—far end allowed (NEP-FEA), near end allowed—far end prohibited (NEA-FEP), and near end allowed—far end allowed (NEA-FEA). In the out of service state, a TCP connection has either not been established or has been disabled. In the connecting state, a TCP connection is being established between TCP software associated with TALI endpoints. "Prohibited" refers to a condition in which a TCP connection is established but TALI service messages are not permitted to be sent to the side for which message flow is prohibited. Finally, "allowed" refers to the willingness of one side of a connection to accept TALI service messages. As used herein, TALI service messages are messages that carry application data. TALI messages are messages such as allow, prohibit, monitor, and test, that carry TALI control information. SAAL messages that are not used to carry application data also fall into the TALI messages group. Thus, when in the prohibited state, TALI messages are permitted, while TALI service messages are not permitted.

The events listed in column 1 of Table 1 include timer expirations, receipt of messages, protocol violations, etc. The TALI protocol includes four main timers: T1, T2, T3, and T4. The T1 timer represents the time interval between the origination of a test message at each TALI implementation. Each time T1 expires, a TALI implementation should send a test message. The test message will be discussed in more detail below with regard to monitoring the status of a TALI connection.

The timer T2 represents the amount of time that a TALI implementation has to return an allow or a prohibit message in response to a test message. If the far end of a TALI connection fails to reply with an allow or prohibit message before T2 expires, the sender of the test message treats the T2 message as a protocol violation (PV).

The timer T3 controls the length of time that the near end of the TALI connection should process service data that is received from the far end of a TALI connection after a management prohibit traffic event has occurred at the near end. As used herein, a "management event" is an action performed by an application that resides above and uses the TALI layer. The timer T3 is used when a transition from NEA-FEA (both ends allowed to send service data) to NEP-FEA (only far end willing to send service data) occurs. When an endpoint transitions to the prohibited state, the endpoint is indicating that the endpoint desires to stop receiving service message traffic. That is, if A and B are the endpoints, and endpoint B wishes to not receive service message traffic, then endpoint B sends a prohibit message to endpoint A. After sending the prohibit message, endpoint B receives and processes traffic for T3 seconds. After T3 expires, no service messages are processed by endpoint B. Endpoint A starts diverting traffic to a node other than endpoint B once it receives the prohibit message from endpoint B.

Some data may have been given to the TCP layer at endpoint A for transmission after endpoint B sent the prohibit message but before the prohibit message was received by endpoint A. The application at endpoint A does not have control over messages already given to TCP. If endpoint B did not wait some amount of time, then endpoint B would discard valid messages. Endpoint A would stop passing data to the TCP layer once it has received the prohibit message.

The T4 timer represents the time interval between the origination of the monitor message. Each time T4 expires, the TALI implementation should send a monitor message. The use of monitor messages to measure the round trip time of a connection will be discussed in more detail below.

Other messages illustrated in the events column of Table 1 are special (spcl) messages and extended service (xsrv) messages. Extended service messages are use to transport types of service traffic other than those described above. Special messages are vendor specific messages used to provide services other than those provided by TALI.

Another feature of the invention illustrated in Table 1 is the use of monitor messages to identify the TALI software version of the far end of a TALI connection. For example, according to Table 1, when an implementation receives a monitor message in any state except out of service or connecting, the implementation updates the TALI version of the far end of the connection. Exemplary fields in the monitor message used to identify TALI version will be discussed in more detail below.

The following description illustrates an exemplary path through the state machine illustrated in Table 1. First, TCP software associated with a near end TALI implementation may establish a TCP connection with TCP software associated with a far end TALI implementation. During the TCP connection establishment phase, both TALI implementations are in the connecting state. Once a TCP connection is established, both TALI implementations are in the NEP-FEP state, indicating that TALI service messages cannot be sent. When the near end TALI implementation receives an allow message, the state machine switches to the NEP-FEA state. In the NEP-FEA state, the near end TALI implementation will send an allow message when a management allow traffic event occurs. As used herein, the phrase "management allow traffic event" refers to an event that notifies the TALI implementation that service messages can be sent on the socket in question. Once the near end TALI implementation sends an allow message, the state machine transitions to the NEA-FEA state. In the NEA-FEA state, both TALI implementations can send and receive TALI service messages.

TABLE 1

TALI State Machine

| | | | STATE | | | |
|---|---|---|---|---|---|---|
| EVENT | OOS | Connecting | NEP-FEP | NEP-FEA | NEA-FEP | NEA-FEA |
| T1 Timer Expired | | | Send test Start T1 Start T2 | Send test Start T1 Start T2 | Send test Start T1 Start T2 | Send test Start T1 Start T2 |
| T2 Timer Expired | | | PV | PV | PV | PV |
| T3 Timer Expired | | | PV | PV | | |

TABLE 1-continued

TALI State Machine

| EVENT | OOS | Connecting | NEP-FEP | NEP-FEA | NEA-FEP | NEA-FEA |
|---|---|---|---|---|---|---|
| T4 Timer Expired | | | Send moni Start T4 | Send moni Start T4 | Send moni Start T4 | Send moni Start T4 |
| Received Test Message | | | Send proh | Send proh | Send allo | Send allo |
| Received Allow Message | | | Stop T2 NEP-FEA | Stop T2 | Stop T2 NEA-FEA | Stop T2. |
| Received Prohibit Message | | | Stop T2. Send proa | Stop T2 Send proa NEP-FEP | Stop T2 Send proa | Stop T2. Flush or re-route data Send proa NEA-FEP |
| Received Prohibit Acknowledgment Message | | | Stop T3 | Stop T3 | | |
| Received Monitor Message | | | Update 'far end version' based on moni content Convert moni to mona send mona | Update 'far end version' based on moni content Convert moni to mona send mona | Update 'far end version' based on moni content Convert moni to mona send mona | Update 'far end version' based on moni content Convert moni to mona send mona |
| Received Monitor Acknowledgment Message | | | Implementation dependent processing. | Implementation dependent processing. | Implementation dependent processing. | Implementation dependent processing. |
| Received Service Message | | | PV | If T3 running Process data Else PV | PV | Process data |
| Received 'mgmt' Message | | | If 'far end version' < 2.0 PV Else Process according to the nodes 2.0 mgmt capabilities. | If 'far end version' < 2.0 PV Else Process according to the nodes 2.0 mgmt capabilities. | If 'far end version' < 2.0 PV Else Process according to the nodes 2.0 mgmt capabilities. | If 'far end version' < 2.0 PV Else Process according to the nodes 2.0 mgmt capabilities. |
| Received 'xsrv' Message | | | If 'far end version' < 2.0 PV Else Process according to the nodes 2.0 xsrv capabilities. | If 'far end version' < 2.0 PV Else Process according to the nodes 2.0 xsrv capabilities. | If 'far end version' < 2.0 PV Else Process according to the nodes 2.0 xsrv capabilities. | If 'far end version' < 2.0 PV Else Process according to the nodes 2.0 xsrv capabilities. |
| Received 'spcl' Message | | | If 'far end version' < 2.0 PV Else Process according to the nodes 2.0 spcl capabilities. | If 'far end version' < 2.0 PV Else Process according to the nodes 2.0 spcl capabilities. | If 'far end version' < 2.0 PV Else Process according to the nodes 2.0 spcl capabilities. | If 'far end version' < 2.0 PV Else Process according to the nodes 2.0 spcl capabilities. |
| Connection Established | | start T1 start T2 start T4 if sock_allowed == TRUE Send moni Send allo Send test NEA_FEP Else Send moni Send proh Send test NEP_FEP | | | | |

TABLE 1-continued

TALI State Machine

| EVENT | STATE | | | | | |
|---|---|---|---|---|---|---|
| | OOS | Connecting | NEP-FEP | NEP-FEA | NEA-FEP | NEA-FEA |
| Connection Lost | | | PV | PV | PV | PV |
| Protocol Violation | | | Stop all timers Close the socket Connecting | Stop all timers Close the socket Connecting | Stop all timers Close the socket Connecting | Stop all timers Close the socket Connecting |
| Management Open Socket | Open the socket Connecting | | | | | |
| Management Close Socket | | Close the socket OOS | Stop all timers Close the socket OOS | Stop all timers Close the socket OOS | Stop all timers Close the socket OOS | Stop all timers Close the socket OOS |
| Management Prohibit Socket | sock_allowed = FALSE | sock_allowed = FALSE | sock_allowed = FALSE | sock_allowed = FALSE | sock_allowed = FALSE Send proh Start T3 NEP-FEP | sock_allowed = FALSE Send proh Start T3 NEP-FEA |
| Management Allow Traffic | sock_allowed = TRUE | sock_allowed = TRUE | sock_allowed = TRUE Send allo. NEA-FEP | sock_allowed = TRUE Send allo. NEA-FEA | sock_allowed = TRUE | sock_allowed = TRUE |
| User Part Messages | Reject data | Reject data | Reject data | Reject data | Reject data | Send data |
| Request from higher software layers to send 'mgmt' messages | | | If 'far end version' < 2.0 Ignore/reject Else Process according to the nodes 2.0 mgmt capabilities. | If 'far end version' < 2.0 Ignore/reject Else Process according to the nodes 2.0 mgmt capabilities. | If 'far end version' < 2.0 Ignore/reject else Process according to the nodes 2.0 mgmt capabilities. | If 'far end version' < 2.0 Ignore/reject Else Process according to the nodes 2.0 mgmt capabilities. |
| Request from higher software layers to send 'xsrv' messages | | | If 'far end version' < 2.0 Ignore/reject Else Process according to the nodes 2.0 xsrv capabilities. | If 'far end version' < 2.0 Ignore/reject Else Process according to the nodes 2.0 xsrv capabilities. | If 'far end version' < 2.0 Ignore/reject Else Process according to the nodes 2.0 xsrv capabilities. | If 'far end version' < 2.0 Ignore/reject Else Process according to the nodes 2.0 xsrv capabilities. |
| Request from higher software layers to send 'spcl' | | | If 'far end version' < 2.0 Ignore/reject Else Process according to the nodes 2.0 spcl capabilities. | If 'far end version' < 2.0 Ignore/reject Else Process according to the nodes 2.0 spcl capabilities. | If 'far end version' < 2.0 Ignore/reject Else Process according to the nodes 2.0 spcl capabilities. | If 'far end version' < 2.0 Ignore/reject Else Process according to the nodes 2.0 spcl capabilities. |

Identifying Individual Message Packets Received over Stream-Oriented Connection

Figure 9:
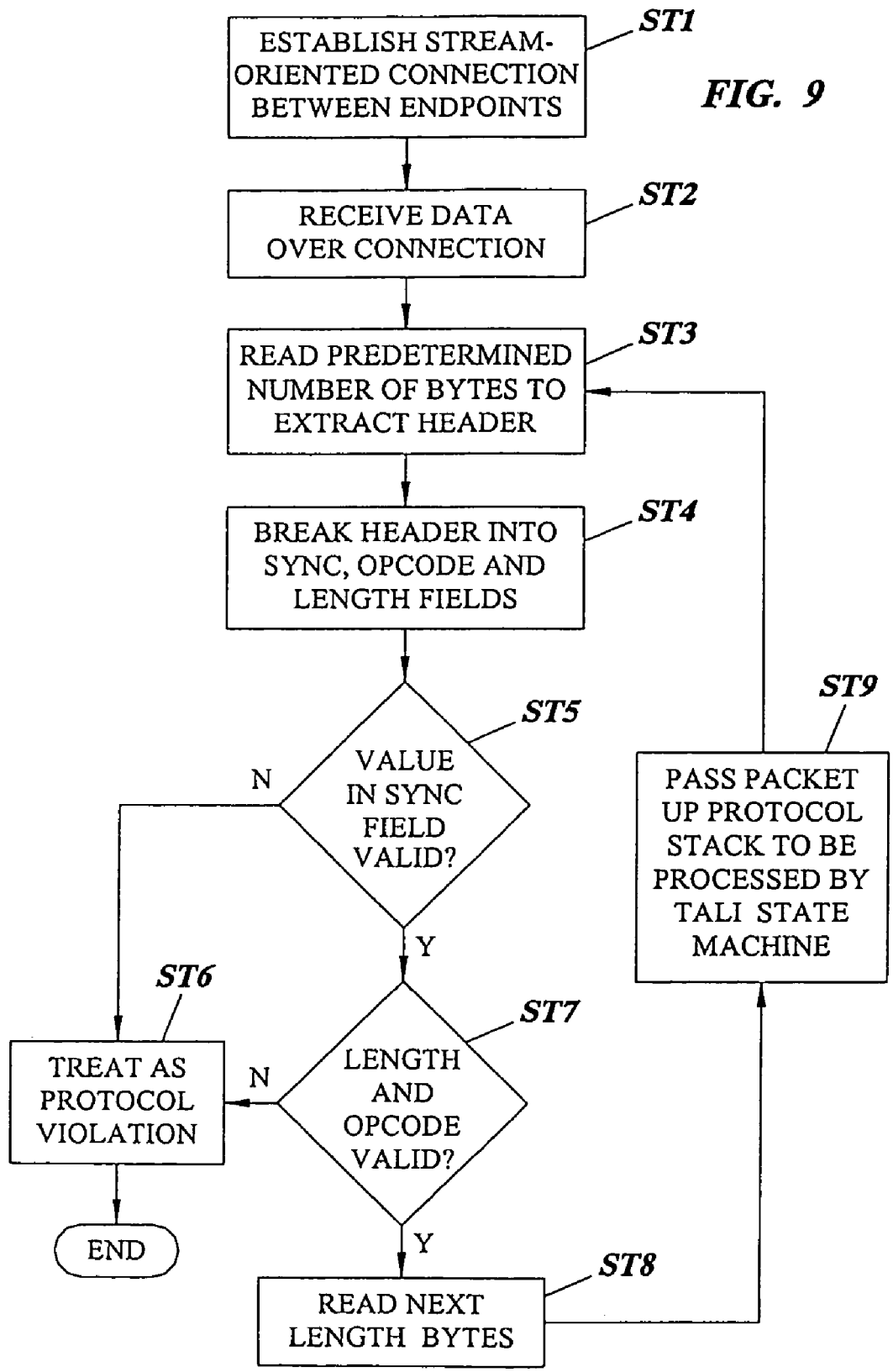
FIG. 9 is a flowchart illustrating exemplary steps for identifying individual message packets received over a stream-oriented connection according to an embodiment of the present invention.

As discussed above, one of the problems associated with receiving data over a stream-oriented connection, such as a TCP connection, is that the packet boundaries created by a sending application may not be preserved by the underlying TCP software. As a result, the receiving application may not receive data in the intended units. The present embodiment solves this problem with regard to TALI packets using the SYNC and LENGTH fields. FIG. 9 is a flowchart illustrating exemplary steps that may be performed by TALI process 322 illustrated in FIG. 3 for identifying TALI packets received over a stream-oriented connection. In step ST1, a stream-oriented connection such as a TCP connection is established between endpoints. The endpoints may be a signaling gateway and a media gateway controller. In step ST2, TALI process 322 receives data over the connection. In step ST3, TALI process 322 reads a predetermined number of bytes to extract the header from the stream of data received over the connection. The predetermined number of bytes is equal to the size of the header as set by the TALI version. For example, the header may be twenty bytes in length.

In step ST4, TALI process 322 breaks the header into SYNC, OPCODE, and LENGTH fields. In step ST5, TALI process 322 determines whether the value in the SYNC field is valid. If the value in the SYNC field is not valid, TALI process 322 treats the message as a protocol violation. If TALI process 322 determines that the SYNC field is valid, TALI process 322 may then determine whether the LENGTH and OPCODE fields are valid (step ST7). In step ST8, TALI process 322 reads the next LENGTH bytes in the data stream after the header. In step ST9, TALI process 322 passes the packet up the protocol stack to be processed by the TALI state machine. Once the TALI packet has been passed up the protocol stack, TALI process 322 returns to step ST3 to read the next data header. Because TALI process 322 uses the SYNC and LENGTH fields to determine packet boundaries, SS7 application design is greatly simplified. There is no need for an SS7 application to be concerned with packet boundaries.

TALI Peer-To-Peer Messages

TALI peer-to-peer messages are messages that are transmitted by the TALI layer of one side of a stream-oriented connection and that are terminated by the TALI layer of the other side of a stream-oriented connection. The TALI peer-to-peer messages that are described herein include test messages for testing the status of a connection, allow and prohibit messages for allowing and prohibiting communications over a connection without invoking TCP connection establishment or termination procedures, and monitor messages for measuring the round trip time of a connection. Each of these messages will now be discussed in more detail.

Test messages are used by a TALI implementation to query the remote end of a TALI connection with respect to the willingness of the remote end to carry SS7 service data. Test messages are preferably sent periodically by each TALI implementation based on a predetermined timeout value. Upon receiving a test message, a TALI implementation must reply with either a prohibit or an allow message to indicate whether the TALI implementation will carry SS7 service data over a TALI connection. If no response is received within the predetermined time period, the connection may be reset and/or reestablished.

Table 2 below illustrates the packet structure of a test message. In Table 2, the test message includes a SYNC field, an OPCODE field, and a LENGTH field. The SYNC field is set to TALI, the OPCODE field is set to test, and the LENGTH field is set to 0.

TABLE 2

| Test Message | | |
|---|---|---|
| Octets | Field Name | Description |
| 0...3 | SYNC | 'TALI' |
| 4...7 | OPCODE | 'test' |
| 8...9 | LENGTH | Length = 0 |

Figure 10:
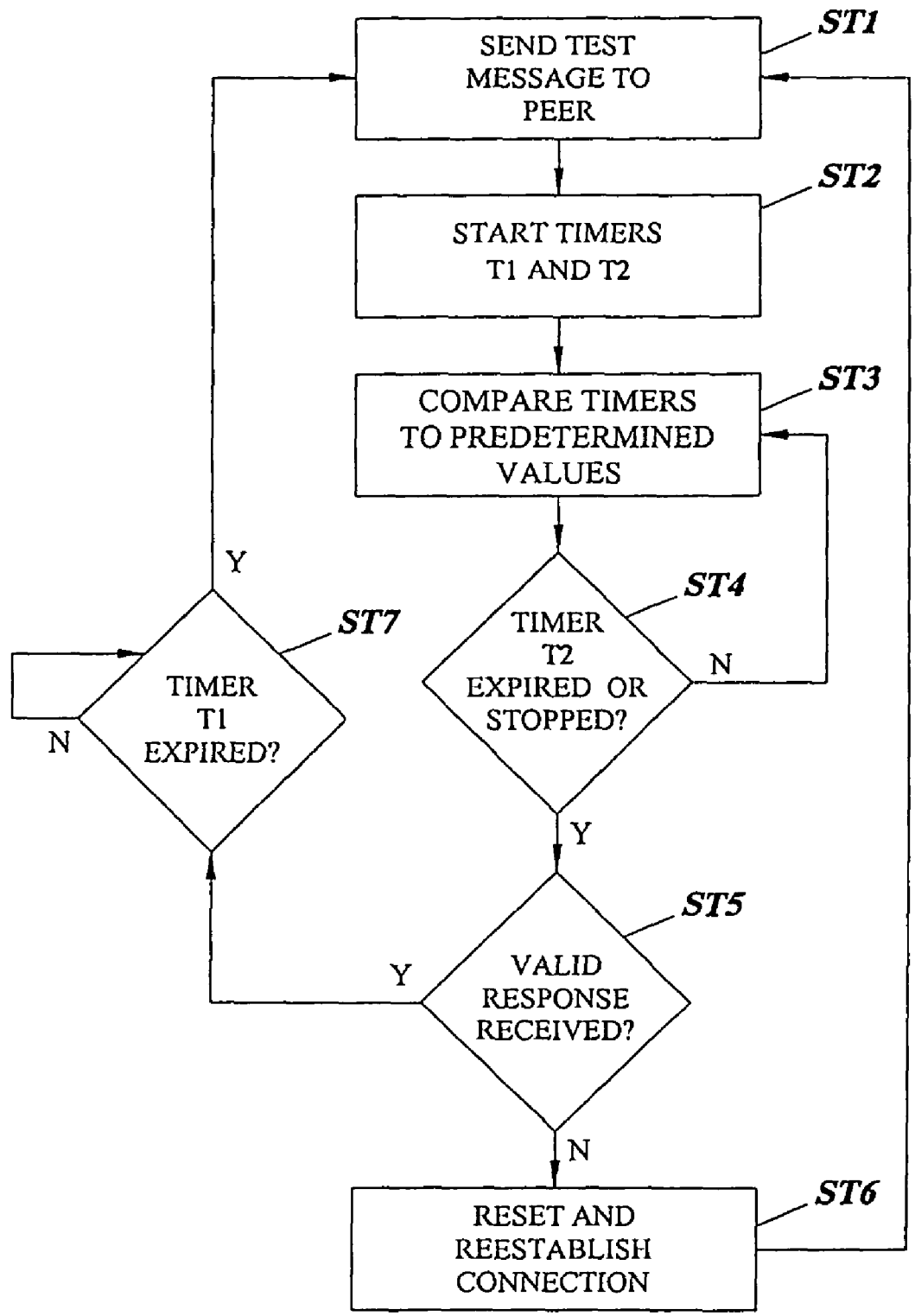
FIG. 10 is a flowchart illustrating exemplary steps for monitoring connection status using transport adapter layer interface messages according to an embodiment of the present invention.

FIG. 10 is a flowchart illustrating exemplary steps that may be performed by a TALI process in monitoring the status of the connection using test messages. In step ST1, TALI process 322 sends a test message to a peer on the other side of a connection. In step ST2, TALI process 322 starts timers T1 and T2. The timer T1 may be used to determine when to send the next test message and the timer T2 may be used to determine the time for receiving a valid response to the test message. In step ST3, timers T1 and T2 are compared to predetermined values. For example, the predetermined value for timer T1 may be set to a time period for sending the next test message. The timer value T2 may be set to a predetermined time period that is preferably less than the keep-alive timer for TCP. For example, the timeout period may be set for two round trip times for the given connection. A method for measuring the round trip time of a connection will be discussed in more detail below.

In step ST4, TALI process 322 determines whether the timer T2 has expired or stopped. The timer T2 expires when it reaches the timeout period set for T2. The timer T2 stops when an allow or a prohibit message is received. If the timer T2 has not expired or stopped, TALI process 322 continues to check the timer. In step ST5, if TALI process 322 determines that the timer T2 has expired, TALI process 322 determines whether a valid response to the test message has been received. As discussed above, a valid response to the test message may be an allow message or a prohibit message. If a valid response has been received, TALI process 322 determines whether timer T1 has expired or stopped, and, if so, sends another test message to the other side (steps ST6 and ST1). In step ST7, if a valid response has not been received, TALI process 322 may reset and attempt to reestablish the connection. Since the timeout period is preferably less than that of a TCP connection, monitoring of connection status using test messages provides more efficient connection management that TCP. Moreover, because test messages are periodically sent and acted upon, TALI connections can be reliably maintained.

Allow and Prohibit Messages

As discussed above, the TALI protocol provides allow and prohibit messages for allowing and prohibiting communications over a TCP connection without invoking TCP connection and establishment and termination procedures. The allow message is sent in reply to a test query or in response to an internal implementation event to indicate that a TALI implementation is willing to carry SS7 service data over a TALI session. As used herein, a TALI session refers to TALI-level connection between endpoints. A TALI session may be created by establishing a TCP connection followed by the exchange of allow messages, as will be discussed in more detail below. The allow message informs the far end that SS7 traffic can be transmitted on the connection. Allow is one of two possible valid replies to a test message. Before SS7 traffic can be carried over a connection, both ends of the connection are required to send allow messages to each other. Table 3 shown below illustrates an exemplary packet structure for an allow message. In Table 3, the allow message includes a SYNC field, an OPCODE field, and a LENGTH field. The SYNC field is set to TALI to indicate that the packet is a TALI packet. The OPCODE field is set to 'allo' to identify an allow message. The LENGTH field is set to 0, since the service portion of the TALI packet does not carry any data.

TABLE 3

| Allow Message | | |
|---|---|---|
| Octets | Field Name | Description |
| 0...3 | SYNC | 'TALI' |
| 4...7 | OPCODE | 'allo' |
| 8...9 | LENGTH | Length = 0 |

Like the allow message, the prohibit message is sent in reply to a test query or in response to an internal implementation event. However, unlike the allow message, the purpose of the prohibit message is to indicate that a TALI implementation is not willing to carry SS7 service over the TALI session. The prohibit message informs the far end that SS7 traffic cannot be transmitted over the connection. As long as one end of the connection remains prohibited, SS7 traffic cannot be carried over the connection. Table 4 illustrates an exemplary packet structure for a prohibit message. In Table 4, the prohibit message includes a SYNC field, an OPCODE field, and a LENGTH field. The SYNC field is set to TALI to identify the message as a TALI packet. The OPCODE field is set to 'proh' for prohibit. The LENGTH field is set to 0, since the message does not carry any data in the service portion of the message.

TABLE 4

Prohibit Message

| Octets | Field Name | Description |
|--------|------------|-------------|
| 0...3  | SYNC       | 'TALI'      |
| 4...7  | OPCODE     | 'proh'      |
| 8...9  | LENGTH     | Length = 0  |

A prohibit acknowledgement message is a message sent by TALI implementation in response to receiving a prohibit message from the far end of a connection. Receipt of a prohibit acknowledgement message indicate that the prohibit message was received correctly and will be acted on accordingly. The side of a connection receiving a prohibit acknowledgement message can thus assume that no more data will be transferred over the connection and that it is okay to perform some desired action associated with the connection. Table 5 shown below illustrates a prohibit acknowledgement message according to an embodiment of the present invention. In Table 5, prohibit acknowledgement message includes a SYNC field, an OPCODE field, and a LENGTH field. The SYNC field may include the value TALI to indicate that the message is a TALI message. The OPCODE field may store the value 'proa' to indicate that the message is a prohibit acknowledgement message. The LENGTH field may include a value of 0, because the service portion of the message does not contain any data.

TABLE 5

Prohibit Acknowledgement Message

| Octets | Field Name | Description |
|--------|------------|-------------|
| 0...3  | SYNC       | 'TALI'      |
| 4...7  | OPCODE     | 'proa'      |
| 8...9  | LENGTH     | Length = 0  |

Figure 11:
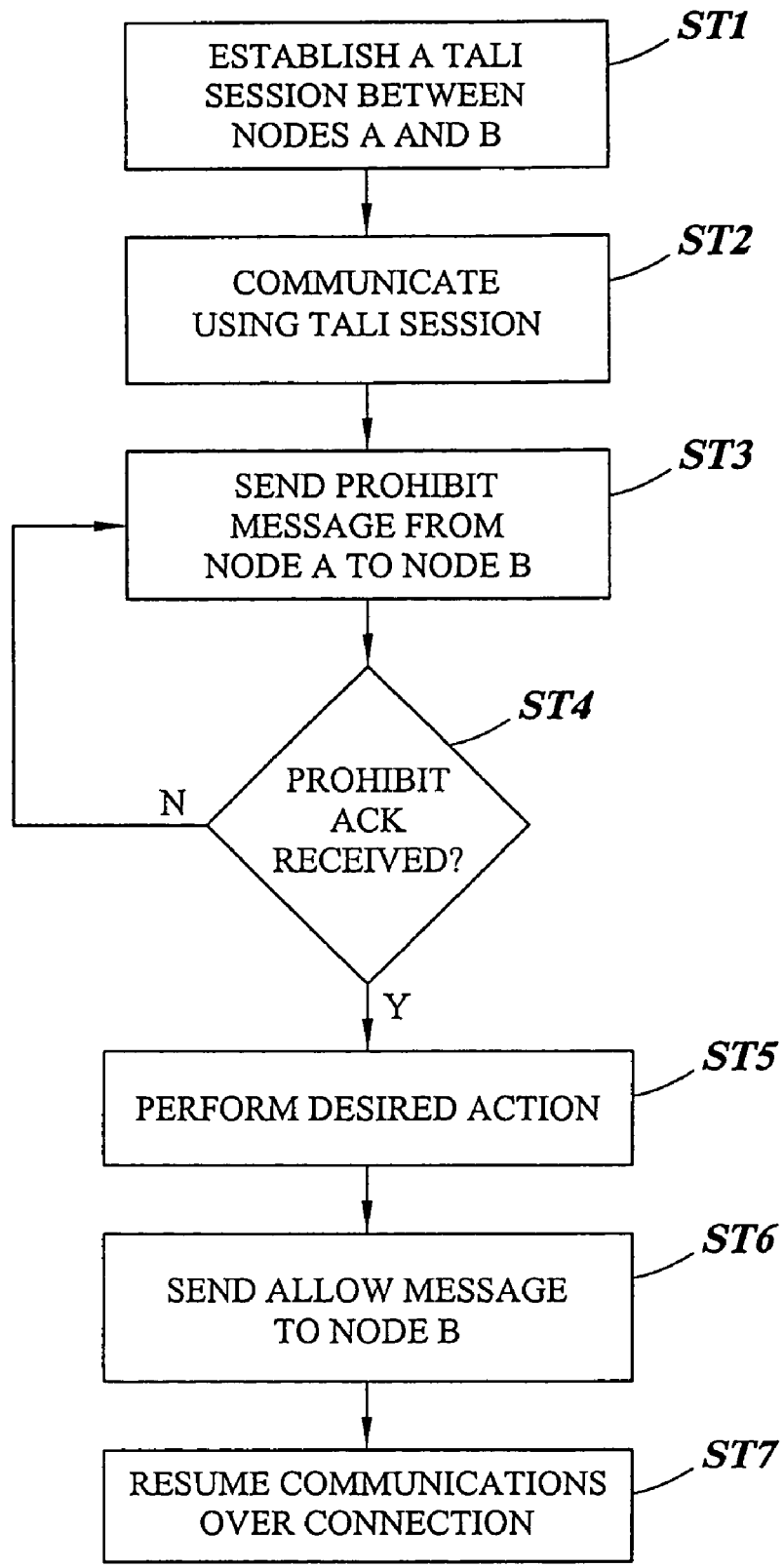
FIG. 11 is a flowchart illustrating exemplary steps for allowing and prohibiting communications using a transport adapter layer interface according to embodiments of the present invention.

FIG. 11 is a flowchart illustrating the advantages of using prohibit and acknowledgement messages to enable and disable connections. In step ST1, a TALI session is established between two nodes, node A and node B. Nodes A and B may each be any type of node previously described in which it is desirable to implement a TALI protocol stack. For example, either node may be a signaling gateway, a media gateway controller, or an IP-capable SCP. Establishing a TALI session may include establishing a TCP connection between nodes A and B followed by the exchange of allow messages between nodes A and B. Once the connection is established and communications are allowed, in step ST2, nodes A and B communicate using the TALI session. Such communication may include exchange of SS7 call signaling messages, such as SCCP messages, TCAP messages, ISUP messages, and MTP3 messages. In step ST3, node A sends a prohibit message to node B. The reason for sending the prohibit message may be that node A desires to perform a software upgrade. In step ST4, node A determines whether a prohibit acknowledge message has been received. If a prohibit acknowledge message has not been received, node A may retransmit the prohibit message.

In step ST5, once node A receives the prohibit acknowledge message, node A can assume that data will not be received from node B over the prohibited connection. Accordingly, the manager of node B can perform some desired action, such as a software upgrade. When the desired action is complete, in step ST6, node A can send an allow message to node B over the connection. Once node B receives the allow message, node B can resume communications over the disabled connection. Because a transport adapter layer interface connection can be allowed and prohibited without invoking TCP connection establishment and termination procedures, the time and processing resources required for these operations are reduced over conventional TCP procedures.

Performance Measurement and Version Identification

According to another aspect of the invention, messages may be sent between TALI implementation to measure performance of a specific connection and to communicate the TALI version number between communication endpoints. One performance measurement that may be of interest is the round trip time. The round trip time is the time for a message to travel from one side of a connection to the other and back. The vehicle for measuring the round trip time according to the present embodiment includes a monitor message and a monitor acknowledgement message. A monitor message provides a generic echo capability that can be used by a TALI implementation in order to measure the round trip time. Table 6 shown below is an example packet structure for the monitor message. In Table 6, the monitor message includes a SYNC field, an OPCODE field, a LENGTH field, a version label field, and a Data field. The SYNC field identifies the monitor message as a TALI message. The OPCODE field includes the value 'moni' to identify the message as a monitor message. The LENGTH field includes the length of the data portion of the monitor message, which contains vendor-dependent data. The version label field in the monitor message may be used to communicate the TALI version number to the far end of a connection. The possible version label field values xxx.yyy specify the major and minor TALI version numbers. For example, a version label field value of 001.000 specifies TALI version 1.0.

TABLE 6

Version Control 'moni' Message

| Octets | Field Name | Description | Type of Field |
|--------|------------|-------------|---------------|
| 0...3  | SYNC       | 'TALI'      | 4 byte Ascii text |
| 4...7  | OPCODE     | 'moni'      | 4 byte Ascii text |
| 8...9  | LENGTH     | Length (include the version label and data fields) | Integer |
| 10...21 | VER. LABEL | 'vers xxx.yyy' | 12 byte Ascii text |
| 22...X | Data       | Vendor Dependent Maximum length of this message (as coded in bytes 8-9, and stored in bytes 10-x) should not exceed 200 bytes | Variable |

In response to receiving a monitor message, a TALI session preferably sends a monitor acknowledgement message. Table 7 shown below illustrates an example packet structure for a monitor acknowledgement message. In the illustrated example, the monitor acknowledgement message includes a SYNC field, an OPCODE field, a LENGTH field, and a Data field. The SYNC field stores the value TALI to indicate the start of a TALI packet. The OPCODE field stores the value 'mona' to identify the packet as a monitor acknowledgement message. The LENGTH field stores the length of the data portion of the monitor acknowledgement message. The data portion of the monitor acknowledgement message preferably includes the same data that was sent in the monitor message. The matching of data allows the monitor message to be paired with the monitor acknowledgement message.

TABLE 7

Monitor Acknowledgement Message

| Octets | Field Name | Description |
|---|---|---|
| 0...3 | SYNC | 'TALI' |
| 4...7 | OPCODE | 'mona' |
| 8...9 | LENGTH | Length |
| 10...X | Data | Vendor Dependent |

Figure 12:
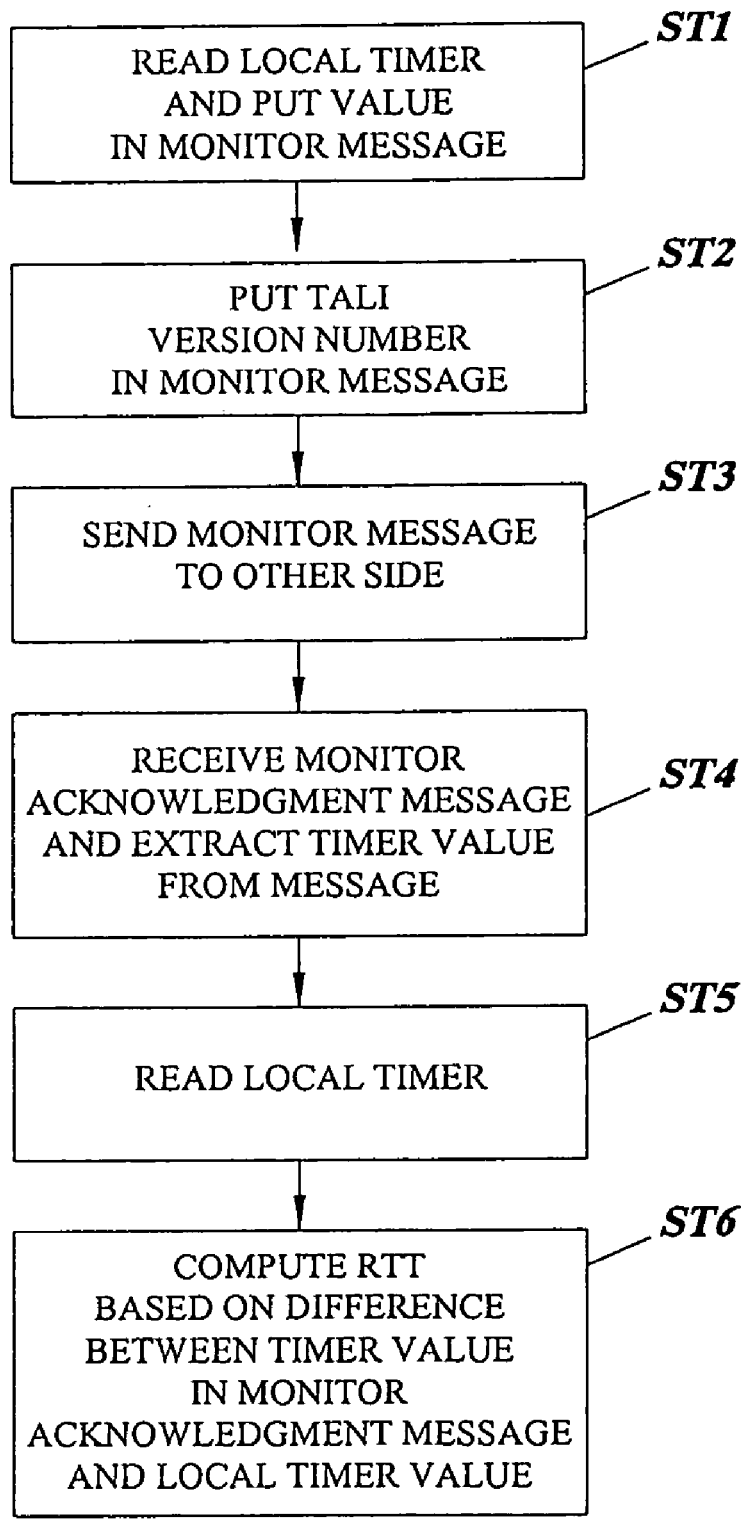
FIG. 12 is a flowchart illustrating exemplary steps for measuring round trip time using transport adapter layer interface messages according to an embodiment of the present invention.

FIG. 12 is a flowchart illustrating the use of the monitor message and the monitor acknowledgement message to measure the round trip time of a connection and to communicate the TALI version number to the far end of a connection. In step ST1, a TALI implementation reads a timer value associated with the local machine and includes the timer value in a monitor message. In step ST2, the TALI implementation places its TALI version number in the monitor message. The version number is used by the other side of a TALI connection to keep track of the version number. For example, upon receiving a monitor message, an endpoint may determine whether the monitor message has a valid version label value in the version label field. This may include comparing bytes located where the version label field should be in the monitor message to a predetermined list of version values. If the value matches one of the values in the list, then the endpoint stores that value as the TALI version for the other side. If the match is not found, the endpoint may store a default version for the other side, e.g., 1.0. Since both sides of a connection preferably send monitor messages to each other and the monitor messages can include the sending sides TALI version number, each side of the connection can determine the current version of the other side.

In step ST3, the TALI implementation sends the monitor message to the other side of a connection. As discussed above, the other side of the connection may use the version label to update the TALI version of the sending side. The other side of the connection changes the OPCODE of the message from monitor to monitor acknowledgment and sends the message back to the sending TALI implementation. In step ST4, the TALI implementation receives the monitor acknowledgement message from the other side of the connection and extracts a timer value from the monitor acknowledgement message. In step ST5, the TALI implementation reads the local timer value when the monitor acknowledgement message was received. In step ST6, the TALI implementation computes the round trip time for the connection based on the difference between the local timer value when the monitor message was received and timer value read from the monitor acknowledgement message. Computing the round trip time in this manner allows optimization of other timers, such as retransmission timers.

Authentication of Critical Messages

As indicated above, many of the messages sent between TALI implementations can allow and/or prohibit communications over a connection. Since such messages could be disastrous in a telecommunications environment, it is preferable that security messages be implemented to ensure that only authorized users can send these messages. One method for providing this security is to authenticate critical messages. Examples of critical messages described herein are prohibit messages and test messages. To ensure that these messages are transmitted by authorized users, encryption and/or authentication procedures can be used. In one example, a public key encryption algorithm, such as Rivest, Shamir, Adleman (RSA), can be used to verify that the message originated from an authorized user. In order to authenticate a message using a public key encryption algorithm, the sending node sends its public key to the receiving node. The sending node then signs the message using its private key. The receiving node then authenticates the message using the sending node's public key. If the message authenticates correctly, i.e., if a valid TALI message is received, then the receiving node knows that the message came from an authorized user. In this manner, the security of TALI connections can be increased.

According to another aspect of the invention, critical messages may be authenticated in a different manner using a public key cryptosystem. For example, a sender and a receiver may exchange public keys. That is, the sender S may send S's public key to the receiver R, and R may send R's public key to S. S may then encrypt a critical message, such as a prohibit message using R's public key. When R receives the message, R may decrypt the message using R's private key. If the message decrypts correctly, R knows that the message comes from someone who has access to R's public key. R may then encrypt a response message, such as a prohibit acknowledgement message, using S's public key. R may then send the message to S. S may decrypt the message using S's private key. If the message decrypts correctly, S knows that the message originated from someone with access to S's public key. In this manner, two-way authentication may be achieved.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for suspending and resuming SS7 message communications over a stream-oriented connection, the method comprising:
    (a) establishing a first stream-oriented connection between a first signaling node and a second signaling node;
    (b) sending and receiving IP-encapsulated SS7 messages over the first stream-oriented connection; and
    (c) receiving, by a transport adapter layer interface (TALI) layer that resides between a transport layer and an SS7 layer in a network protocol stack at the first signaling node, a first control message originating from a TALI layer that resides between a transport layer and an SS7 layer in a network protocol stack of the second signaling node over the first stream-oriented connection and, in response, stopping the sending of SS7 messages from the first signaling node over the first stream-oriented connection, wherein the first control message includes a prohibit message that informs the first signaling node that the second signaling node is not willing to carry any SS7 service over the first stream-oriented connection, wherein the first-stream oriented connection includes a TALI-level session between the first signaling node and the second signaling node.

2. The method of claim 1 comprising, after receiving the first control message, resuming the sending of SS7 messages over the first stream-oriented connection in response to receiving a second control message over the first stream-oriented connection.

3. The method of claim 1 comprising, in response to receiving the first control message, switching SS7 communications between the first and second signaling nodes to a second stream-oriented connection established between the first and second signaling nodes.

4. The method of claim 1 wherein receiving the first control message includes receiving the first control message signed using a predetermined encryption algorithm and verifying that the first control message originating from an authorized node using the first encryption algorithm.

5. The method of claim 1 wherein establishing the first stream-oriented connection between first and second signaling nodes includes establishing the first stream-oriented connection between a signaling gateway and a media gateway controller.

6. The method of claim 1 wherein establishing the first stream-oriented connection between first and second signaling nodes includes establishing a connection between a first SS7 signaling node and an IP node.

7. The method of claim 1 wherein establishing the first stream-oriented connection between first and second signaling nodes includes establishing a connection between a first IP-capable SS7 signaling node and a second IP-capable SS7 node.

8. A computer program product comprising computer-executable instructions embodied in a non-transitory computer readable medium for performing steps comprising:
  (a) establishing a first stream-oriented connection between a first signaling node and a second signaling node;
  (b) sending and receiving IP-encapsulated SS7 messages over the first stream-oriented connection; and
  (c) receiving, by a transport adapter layer interface (TALI) layer that resides between a transport layer and an SS7 layer in a network protocol stack at the first signaling node, a first control message originating from a TALI layer that resides between a transport layer and an SS7 layer in a network protocol stack of the second signaling node over the first stream-oriented connection and, in response, stopping the sending of SS7 messages from the first signaling node over the first stream-oriented connection, wherein the first control message includes a prohibit message that informs the first signaling node that the second signaling node is not willing to carry any SS7 service over the first stream-oriented connection, wherein the first-stream oriented connection includes a TALI-level session between the first signaling node and the second signaling node.

9. The computer program product of claim 8 comprising, after receiving the first control message, resuming the sending of SS7 messages over the first stream-oriented connection in response to receiving a second control message over the first stream-oriented connection.

10. The computer program product of claim 8 comprising, in response to receiving the first control message, switching SS7 communications between the first and second signaling nodes to a second stream-oriented connection established between the first and second signaling nodes.

11. The computer program product of claim 8 wherein receiving the first control message includes receiving the first control message signed using a predetermined encryption algorithm and verifying that the first control message originated from an authorized node using the first encryption algorithm.

12. The computer program product of claim 8 wherein establishing the first stream-oriented connection between first and second signaling nodes includes establishing the first stream-oriented connection between a signaling gateway and a media gateway controller.

13. The computer program product of claim 8 wherein establishing the first stream-oriented connection between first and second signaling nodes includes establishing a connection between a first SS7 signaling node and an IP node.

14. The computer program product of claim 8 wherein establishing the first stream-oriented connection between first and second signaling nodes includes establishing a connection between a first IP-capable SS7 signaling node and a second IP-capable SS7 node.

* * * * *